United States Patent
Yano et al.

(10) Patent No.: US 8,942,759 B2
(45) Date of Patent: Jan. 27, 2015

(54) DETECTED INFORMATION CORRECTION APPARATUS AND METHOD

(75) Inventors: Ai Yano, Kawasaki (JP); Ryuichi Matsukura, Kawasaki (JP); Jun Kakuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1002 days.

(21) Appl. No.: 12/971,771

(22) Filed: Dec. 17, 2010

(65) Prior Publication Data

US 2011/0159915 A1 Jun. 30, 2011

(30) Foreign Application Priority Data

Dec. 25, 2009 (JP) ................................. 2009-294487

(51) Int. Cl.
*H04M 1/00* (2006.01)
*G06F 3/01* (2006.01)
*G06F 1/16* (2006.01)

(52) U.S. Cl.
CPC .............. *G06F 1/1694* (2013.01); *G06F 3/017* (2013.01); *G06F 2200/1636* (2013.01); *G06F 1/1626* (2013.01)
USPC .................. 455/550.1; 455/556.2; 455/556.1; 455/404.2

(58) Field of Classification Search
CPC ................ G05B 2219/35444; H04M 2250/12; H04M 2250/22; H04M 1/0212; H04M 1/0231; H04M 1/0233; H04M 1/0241; H04M 1/72519; H04M 1/72541
USPC .......... 455/550.1, 556.1, 556.2, 557, 418, 68; 463/1, 3, 4, 7, 8, 30–42; 273/317.1–317.9, 108.1–108.57, 273/440.1, 442, 443, 461; D21/324–333; 257/678

See application file for complete search history.

(56) References Cited

U.S. PATENT DOCUMENTS

| | | | | |
|---|---|---|---|---|
| 5,327,140 A | * | 7/1994 | Buckreuβ | 342/25 A |
| 5,966,549 A | * | 10/1999 | Hara et al. | 396/54 |
| 6,233,009 B1 | * | 5/2001 | Morofuji et al. | 348/208.8 |
| 6,573,883 B1 | | 6/2003 | Bartlett | |
| 2003/0045274 A1 | | 3/2003 | Nishitani | |
| 2005/0071118 A1 | | 3/2005 | Usuda et al. | |

(Continued)

FOREIGN PATENT DOCUMENTS

| | | |
|---|---|---|
| JP | 2003-76368 | 3/2003 |
| JP | 2004-96501 | 3/2004 |

(Continued)

OTHER PUBLICATIONS

Extended European Search Report issued Jul. 21, 2011 in corresponding European Patent Application No. EP 10196455.

(Continued)

*Primary Examiner* — Ronald Eisner
(74) *Attorney, Agent, or Firm* — Staas & Halsey LLP

(57) ABSTRACT

A detected information correction apparatus configured to correct detected information, includes: a usage status detecting configured to detect status information on the basis of detected information detected by one or more sensors, the status information indicating how a portable apparatus is being used; a correction data acquiring configured to acquire correction data at specific timing intervals, the correction data being used to correct the detected information; and a detected information correcting configured to correct the detected information with the correction data.

9 Claims, 20 Drawing Sheets

(56) References Cited

U.S. PATENT DOCUMENTS

| | | | |
|---|---|---|---|
| 2007/0259717 A1* | 11/2007 | Mattice et al. | 463/36 |
| 2008/0101783 A1* | 5/2008 | Kanda et al. | 396/55 |
| 2008/0204407 A1* | 8/2008 | Ueno | 345/156 |
| 2009/0002217 A1 | 1/2009 | Kryze et al. | |
| 2010/0121183 A1* | 5/2010 | Taguchi et al. | 600/427 |

FOREIGN PATENT DOCUMENTS

| | | |
|---|---|---|
| JP | 2004-145378 | 5/2004 |
| JP | 2006-154345 | 6/2006 |
| JP | 2009089048 A | 4/2009 |
| WO | WO 01-78055 | 10/2001 |
| WO | WO 2006-000639 | 1/2006 |
| WO | WO 2007074502 | 7/2007 |

OTHER PUBLICATIONS

Office Action issued Sep. 14, 2012 in corresponding European Patent Application No. 10 196 455-9-2211 (5 pages).

Japanese Office Action mailed Sep. 3, 2013 in corresponding Japanese Patent Application No. 2009-294487 (4 pages) (3 pages English Translation).

* cited by examiner

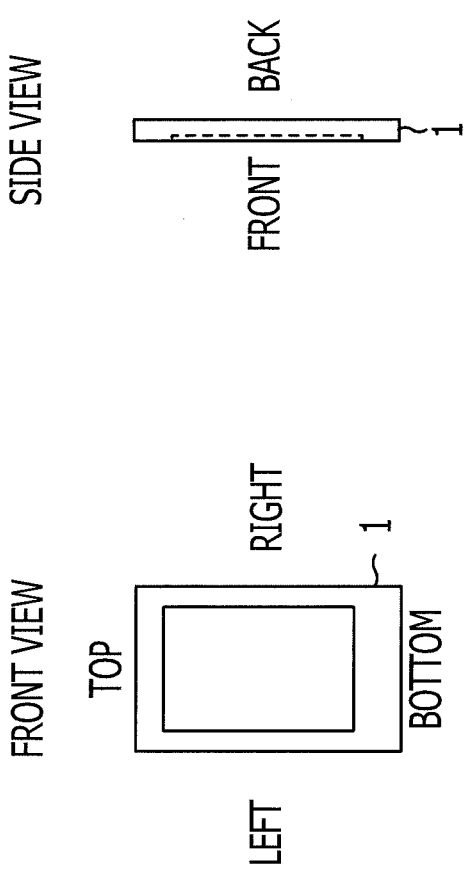
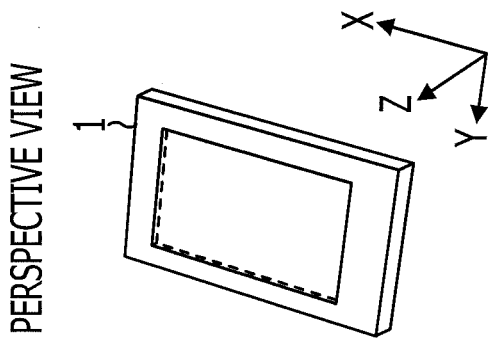

FIG. 5

TLA

| FEATURE VALUE | MOTION | COMMAND (OPERATION) |
|---|---|---|
| Fa | TILT DEVICE TOWARDS USER | SCROLL SCREEN DOWN |
| Fb | TILT DEVICE AWAY FROM USER | SCROLL SCREEN UP |
| Fc | TILT DEVICE RIGHT | DISPLAY NEXT PAGE |
| Fd | TILT DEVICE LEFT | DISPLAY PREVIOUS PAGE |
| Fe | DOUBLE-TAP TOP FRAME OF DEVICE | RETURN TO LAUNCHER (INITIAL) SCREEN |
| Ff | DOUBLE-TAP RIGHT FRAME OF DEVICE | DISPLAY SUB-MENU |
| Fg | SLIDE DEVICE RIGHT | SCROLL SCREEN RIGHT |
| Fh | SLIDE DEVICE LEFT | SCROLL SCREEN LEFT |
| ... | ... | ... |

FIG. 9A

TLB1(TLB)

| ORIENTATION | GRIP POSITION | AXIS | DIRECTION | CORRECTION VALUE |
|---|---|---|---|---|
| VERTICAL | LEFT | X | + | 1.5 |
| | | | − | 1 |
| | | Y | + | 1 |
| | | | − | 1 |
| | | Z | + | 1 |
| | | | − | 1 |

FIG. 9B

TLB2(TLB)

| ORIENTATION | GRIP POSITION | AXIS | DIRECTION | CORRECTION VALUE |
|---|---|---|---|---|
| VERTICAL | RIGHT | X | + | 1.5 |
| | | | − | 1 |
| | | Y | + | 1 |
| | | | − | 1.5 |
| | | Z | + | 1 |
| | | | − | 1 |

FIG. 9C

TLB3(TLB)

| ORIENTATION | GRIP POSITION | AXIS | DIRECTION | CORRECTION VALUE |
|---|---|---|---|---|
| VERTICAL | BOTTOM | X | + | 1.5 |
| | | | − | 1 |
| | | Y | + | 1.5 |
| | | | − | 1 |
| | | Z | + | 1 |
| | | | − | 1 |

FIG. 9D

TLB4(TLB)

| ORIENTATION | GRIP POSITION | AXIS | DIRECTION | CORRECTION VALUE |
|---|---|---|---|---|
| HORIZONTAL | LEFT | X | + | 1.4 |
| | | | − | 1 |
| | | Y | + | 1.4 |
| | | | − | 1 |
| | | Z | + | 1 |
| | | | − | 1 |

FIG. 9E

TLB5(TLB)

| ORIENTATION | GRIP POSITION | AXIS | DIRECTION | CORRECTION VALUE |
|---|---|---|---|---|
| HORIZONTAL | RIGHT | X | + | 1 |
| | | | − | 1.5 |
| | | Y | + | 1.5 |
| | | | − | 1 |
| | | Z | + | 1 |
| | | | − | 1 |

FIG. 9F

TLB6(TLB)

| ORIENTATION | GRIP POSITION | AXIS | DIRECTION | CORRECTION VALUE |
|---|---|---|---|---|
| HORIZONTAL | BOTTOM | X | + | 1.4 |
| | | | − | 1 |
| | | Y | + | 1.4 |
| | | | − | 1 |
| | | Z | + | 1 |
| | | | − | 1 |

# DETECTED INFORMATION CORRECTION APPARATUS AND METHOD

CROSS-REFERENCE TO RELATED APPLICATIONS

This application is based upon and claims the benefit of priority of the prior Japanese Patent Application No. 2009-294487, filed on Dec. 25, 2009, the entire contents of which are incorporated herein by reference.

FIELD

Embodiments herein relate to an apparatus and method configured to correct detected information that has been detected by a sensor.

BACKGROUND

Recently, devices such as mobile phones, smartphones, personal digital assistants (PDAs), and handheld game consoles are being equipped with motion sensors. Herein, a motion sensor refers to a sensor for detecting the motion of a mobile phone handset 1, and may be an acceleration sensor, a gyro sensor, or a magnetic sensor, for example.

Several technologies using motion sensors have been proposed. For example, a motion sensor may be used as follows in order to detect the movement of infants. An acceleration sensor or similar distance detecting means is attached to each infant being cared for at a nursery or similar facility, and the infants' movements are continuously recorded. The infants are also recorded using a TV camera designed for image processing, or similar position detecting means. The position of each infant is detected without identifying the infants themselves. Subsequently, the infant distance information detected by the distance detecting means is cross-referenced with the infant position information detected by the position detecting means, and the successive positions of each infant are detected while individually identifying each infant. (for example, Japanese Unexamined Patent Application Publication No. 2004-96501).

As another example, a motion sensor may be built into an image stabilization unit for an imaging apparatus as follows. The image stabilization unit is provided with: a wobble sensor that detects wobble; an imaging unit that includes an imaging element and optics; a chassis that supports the imaging unit; and an actuator. The actuator stabilizes the apparatus by proportionally driving the imaging unit and the chassis relative to the wobble detected by the wobble sensor. The chassis covers the imaging unit with at least a lateral part and a bottom part. The wobble sensor is disposed farther inward than the outer surface of the lateral part of the chassis part. (for example, Japanese Unexamined Patent Application Publication No. 2006-154345).

Also, as more and more devices become equipped with motion sensors, it is anticipated that motion user interfaces (motion UIs) will become common. Herein, a motion UI refers to a UI whereby a user can issue commands, input data, and perform various other actions with respect to a device by tilting and moving the device. Such a motion UI may be used instead of, or in conjunction with, other input methods such as a mouse, keyboard, or touch panel.

Operating a motion UI is easier than operating other input methods such as a mouse, keyboard, or touch panel. Consequently, motion UIs are attracting attention as a type of UI for operating devices easily.

Mobile phones equipped with motion UIs have been proposed. For example, a mobile phone may be provided with a gesture sensor such as a three-dimensional acceleration sensor. In so doing, particular gestures can be detected, such as the user shaking the mobile phone. The mobile phone controls the production of musical tones in accordance with the gestures detected by the gesture sensor, and the musical tones controlled according to the user gestures are emitted from a speaker. (for example, Japanese Unexamined Patent Application Publication No. 2003-76368.)

SUMMARY

According to an aspect of the invention, a detected information correction apparatus configured to correct detected information, includes: a usage status (state) detecting configured to detect status information on the basis of detected information detected by one or more sensors, the status information indicating how a portable apparatus is being used; a correction data acquiring configured to acquire correction data at specific timing intervals, the correction data being used to correct the detected information; and a detected information correcting configured to correct the detected information with the correction data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A to 1C illustrate an example of the exterior appearance of a mobile phone handset;

FIG. 5 illustrates an example of a motion lookup table;

FIGS. 9A to 9F illustrate exemplary correction value tables;

DESCRIPTION OF EMBODIMENTS

Even when a user intends to issue the same command with respect to a device by using a motion user interface (motion UI), the motion sensors will detect different accelerations depending on various circumstances, such as the user who is using the device, the way the device is held, or the environment in which the device is used (such as on a train or while walking). A device can be held in many ways, such as with the left hand, with the right hand, and/or with both hands. The top of the device may be held, the bottom of the device may be held, and the device may be held with its display surface parallel or perpendicular to the ground, for example.

When detecting accelerations that differ depending on various circumstances, there is a chance that the device will misinterpret the command that the user intended to issue to the device.

Figure 2:
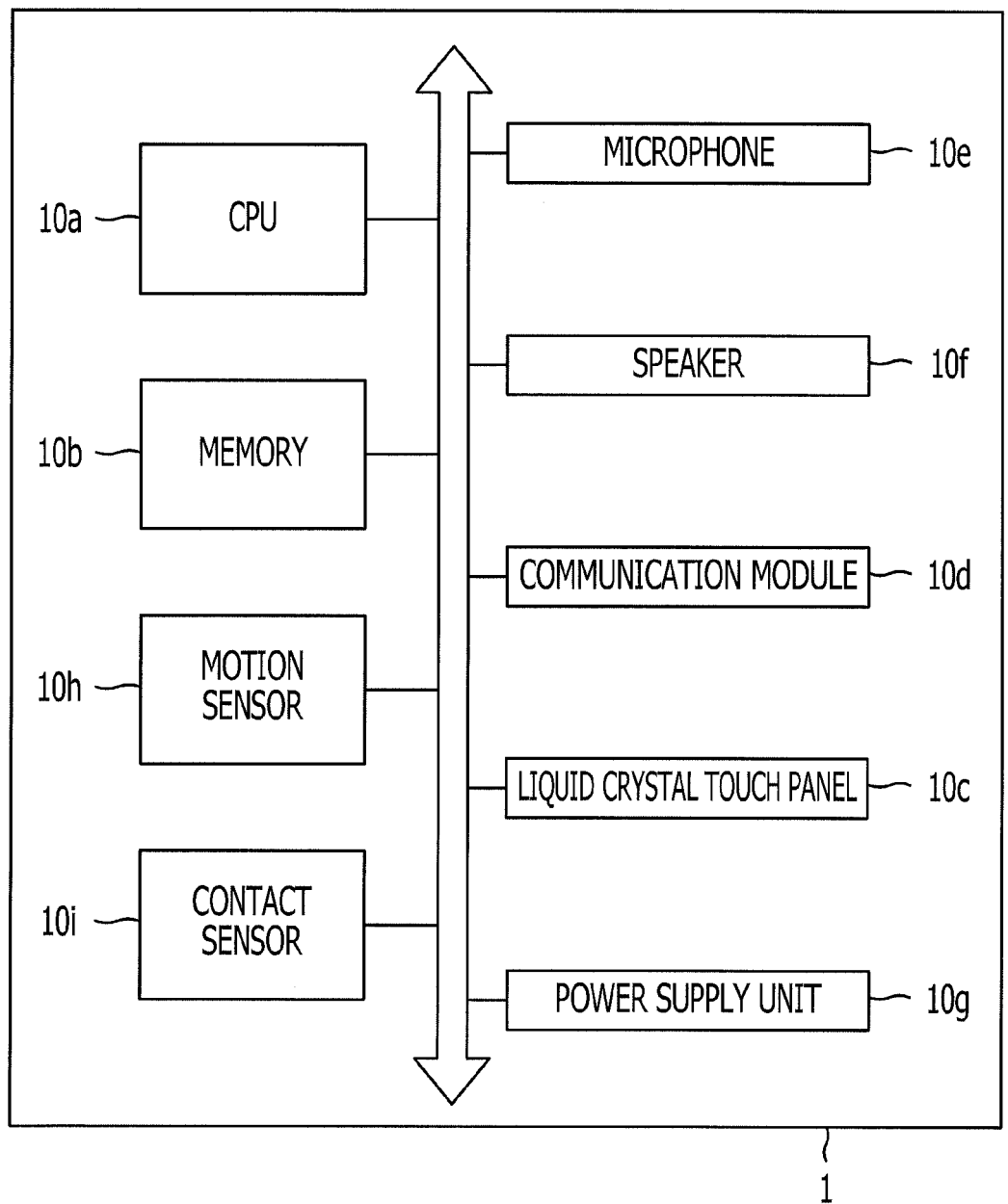
FIG. 2 illustrates an exemplary hardware configuration of a mobile phone handset.
Figure 3:
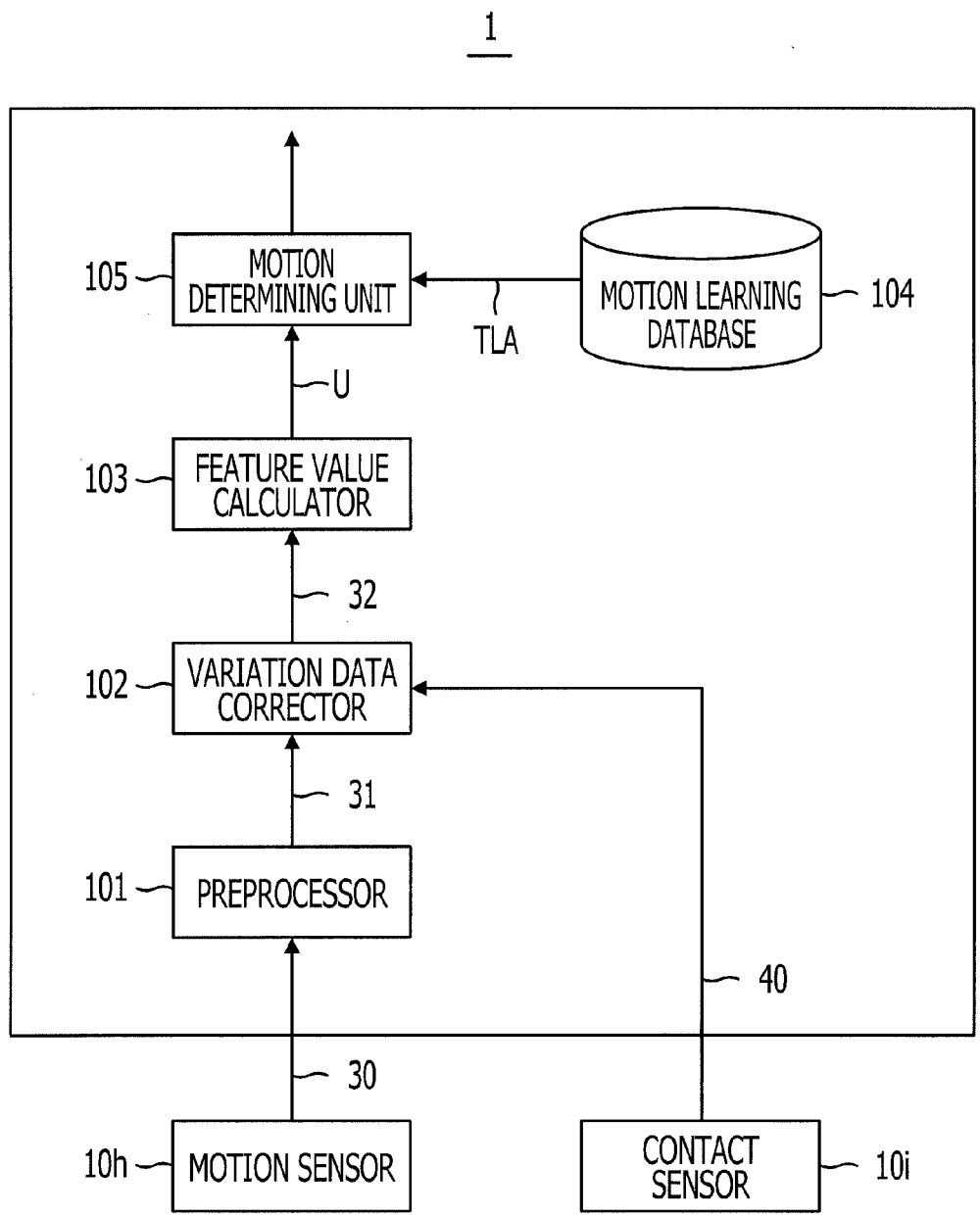
FIG. 3 illustrates an exemplary functional configuration of a mobile phone handset.

FIGS. 1A to 1C illustrate an example of the exterior appearance of a mobile phone handset 1. FIG. 2 illustrates an exemplary hardware configuration of the mobile phone handset 1. FIG. 3 illustrates an exemplary functional configuration of the mobile phone handset 1. FIGS. 4A to 4F illustrate examples of the relative positions of the mobile phone handset 1 and a user's hand. FIG. 5 illustrates an example of a motion lookup table TLA.

The mobile phone handset 1 is an apparatus provided with functions for communicating with other apparatus, for example, via a mobile phone network, wireless network, etc. The chassis of the mobile phone handset 1 can be approximately sized to fit in the palm of a person's hand, and its shape is rectangular. Hereinafter, the height, width, and thickness axes of the mobile phone handset 1 will be respectively defined as the X, Y, and Z axes, as illustrated in FIGS. 1A to 1C. The positive (+) and negative (−) directions of each axis are also defined as illustrated in FIGS. 1A to 1C.

As illustrated in FIG. 2, the mobile phone handset 1 includes components such as a central processing unit (CPU) 10a, memory 10b, a liquid crystal touch panel 10c, a communication module 10d, a microphone 10e, a speaker 10f, a power supply unit 10g, a motion sensor 10h, and a contact sensor 10i.

The liquid crystal touch panel 10c is a touch panel of the liquid crystal type. Various screens are displayed on the liquid crystal touch panel 10c according to user operations and other events. In addition, the liquid crystal touch panel 10c detects positions that the user has touched, and sends a signal indicating those positions to the CPU 10a.

The mobile phone handset 1 in FIGS. 1A to 1C is illustrated as being a mobile phone handset provided with a liquid crystal touch panel 10c that occupies almost all of the handset's front surface. However, it should be appreciated that a mobile phone handset provided with both a liquid crystal touch panel 10c as well as a keypad or other buttons may also be used as the mobile phone handset 1.

The communication module 10d is an apparatus configured to wirelessly communicate with base stations or similar apparatus. The microphone 10e picks up audio and converts that audio into a digital signal. The speaker 10f outputs audio on the basis of information such as digital signals received by the communication module 10d.

The power supply unit 10g supplies power from a battery or commercial power source to the respective hardware components constituting the mobile phone handset 1.

The motion sensor 10h is a sensor configured to detect the motion of the mobile phone handset 1. The sensor used for the motion sensor 10h may be an acceleration sensor, an angular velocity sensor, a gyro sensor, and/or a magnetic sensor, for example.

For example, if an acceleration sensor is used for the motion sensor 10h, then respective accelerations can be measured in the X, Y, and Z axis directions. The combination of the per-axis accelerations expresses the orientation of the mobile phone handset 1. Moreover, by continuing to measure the per-axis accelerations, the position of the mobile phone handset 1 or changes in its orientation can be detected. In other words, the motion of the mobile phone handset 1 can be detected.

Alternatively, if a gyro sensor is used for the motion sensor 10h, then respective angular velocities can be measured for rotation about the X, Y, and Z axes. The combination of the per-axis angular velocities expresses the orientation of the mobile phone handset 1. Moreover, by continuing to measure the per-axis angular velocities, the position of the mobile phone handset 1 or changes in its orientation can be detected. In other words, the motion of the mobile phone handset 1 can be detected.

In this way, the motion sensor 10h measures values that express the orientation of the mobile phone handset 1. Moreover, by measuring the changes in these values, the mobile phone handset 1 is able to detect its own motion.

The contact sensor 10i is a sensor configured to detect which parts of the mobile phone handset 1 are being touched by the user's hands. The sensor used for the contact sensor 10i may be a light sensor, a temperature sensor, and/or a proximity sensor, for example. The liquid crystal touch panel 10c may also be used as all or part of the contact sensor 10i.

In the memory 10b, there are installed programs and data configured to realize the functions of various components, such as the preprocessor 101, the variation data corrector 102, the feature value calculator 103, the motion learning database 104, and the motion determining unit 105 illustrated in FIG. 3, for example. These programs are executed by the CPU 10a.

The user is able to issue a variety of commands to the mobile phone handset 1 by performing gestures with the entire mobile phone handset 1 (i.e., predetermined motions (movements) or changes in spatial orientation of and/or touches to body or frame of the mobile phone handset 1). For example, the user may be able to issue a screen scroll command by moving the mobile phone handset 1 to the right.

The determination of motion is primarily conducted by the motion sensor 10h and the contact sensor 10i, in cooperation with the respective components illustrated in FIG. 3. In particular, the variation data corrector 102 executes processes to correct variations in the determined motion of the mobile phone handset 1. In so doing, the determination of motion can be conducted more accurately than the related art. Hereinafter, the processes and other features of the motion sensor 10h, contact sensor 10i, and respective components illustrated in FIG. 3 will be described in order.

The motion sensor 10h continuously measures accelerations and/or angular velocities. In so doing, data that indicates the changes (i.e., variation) in the per-axis accelerations and/or angular velocities of the mobile phone handset 1 is obtained. Hereinafter, this data will be referred to as the variation data 30.

The contact sensor 10i detects which parts of the mobile phone handset 1 are being touched by the user. In so doing, data that indicates the detected parts is obtained. Hereinafter, this data will be referred to as the contact data 40.

The preprocessor 101 conducts a process to remove noise from the variation data 30. The process to remove noise may be conducted using a low-pass filter (LPF). Hereinafter, variation data 30 that has been subjected to this process will be referred to as variation data 31.

In the variation data 31, there are expressed features regarding the circumstances in which the mobile phone handset 1 is being used. For example, even if the same user uses the mobile phone handset 1, different features can be expressed in the variation data 31 according to various circumstances, such as whether the mobile phone handset 1 is being used while the user is inside a moving train, while the user is walking, or while the user is sitting down in a chair and not on board a vehicle.

Furthermore, even if the mobile phone handset 1 is being used under identical circumstances, different features can be expressed in the variation data 31 if different users use the mobile phone handset 1. This is because individual users operate the mobile phone handset 1 in their own particular ways.

In addition, even if the same user attempts to perform the same motion under identical circumstances, different features can be expressed in the variation data 31 according to how the mobile phone handset 1 is held. For example, as illustrated in FIGS. 4A to 4F, the mobile phone handset 1 may be held in a vertical or horizontal orientation, and the user may hold the mobile phone handset 1 on the left side, on the right side, or on the bottom (as seen from the user's perspective). Thus, even if the same user holds the mobile phone handset 1, different features will be expressed in the variation data 31 according to how the mobile phone handset 1 is held.

Different features are thus expressed in the variation data 31, according to the circumstances in which the mobile phone handset 1 is used, the user who uses the mobile phone handset 1, and/or the way in which the mobile phone handset 1 is held. For this reason, it can be difficult to accurately determine which motions the user is performing with respect to the mobile phone handset 1.

Consequently, the variation data corrector 102 uses the variation data 31 as a basis for detecting factors such as the circumstances under which the mobile phone handset 1 is currently being used, and/or the habits of the user using the mobile phone handset 1. Additionally, the variation data corrector 102 uses the contact data 40 as a basis for detecting the way in which the mobile phone handset 1 is held. Subsequently, the variation data corrector 102 conducts a process to correct the variation data 31 on the basis of these detection results. Hereinafter, variation data 31 that has been subjected to this correction process will be referred to as the variation data 32.

The feature value calculator 103 computes values that indicate features of the motion of the mobile phone handset 1 as expressed by the variation data 32. For example, the feature value calculator 103 may compute the mean and/or the variance of the accelerations or angular velocities indicated by the variation data 32 for each of the X, Y, and Z axes. Alternatively, the feature value calculator 103 may utilize a calculation technique such as the fast Fourier transform (FFT). Hereinafter, the values computed by the feature value calculator 103 will be collectively referred to as the feature value U.

In the motion learning database 104, a motion lookup table TLA is stored, for example, in advance. As illustrated in FIG. 5, the motion lookup table TLA indicates motions corresponding to particular feature values F (Fa, Fb, Fc, etc.).

The motion determining unit 105 determines a motion performed with respect to the mobile phone handset 1 on the basis of the feature value U computed by the feature value calculator 103, as well as the motion lookup table TLA stored in the motion learning database 104.

For example, the respective values for the X, Y, and Z axes (Gx, Gy, Gz) contained in the feature value U may be compared against respective values for the X, Y, and Z axes (Fx, Fy, Fz) of each feature value F expressed in the motion lookup table TLA. If the values (Gx, Gy, Gz) contained in the feature value U are equal to or greater than the respective values (Fx, Fy, Fz) of one of the feature values F expressed in the motion lookup table TLA for all three axes, then the motion determining unit 105 determines that the motion associated with that feature value F has been performed. (In other words, for example, the above determination is made when the conditions Gx≥Fx, Gy≥Fy, and Gz≥Fz are all satisfied). In contrast, if there are no feature values F that satisfy the conditions, then the motion determining unit 105 determines that no motion was performed. Hereinafter, these conditions will be referred to as the motion conditions.

If the motion that was performed can be determined, then the mobile phone handset 1 conducts a process associated with that motion on the basis of the motion lookup table TLA. For example, if it is determined that the "tilt device towards user" motion has been performed, then a process to scroll the screen down can be conducted.

The correction of the variation data 31 by the variation data corrector 102 can be conducted using a variety of methods. Hereinafter, exemplary methods for correcting the variation data 31 will be described in order.

[First Method for Correcting Variation Data 31]

Figure 6:
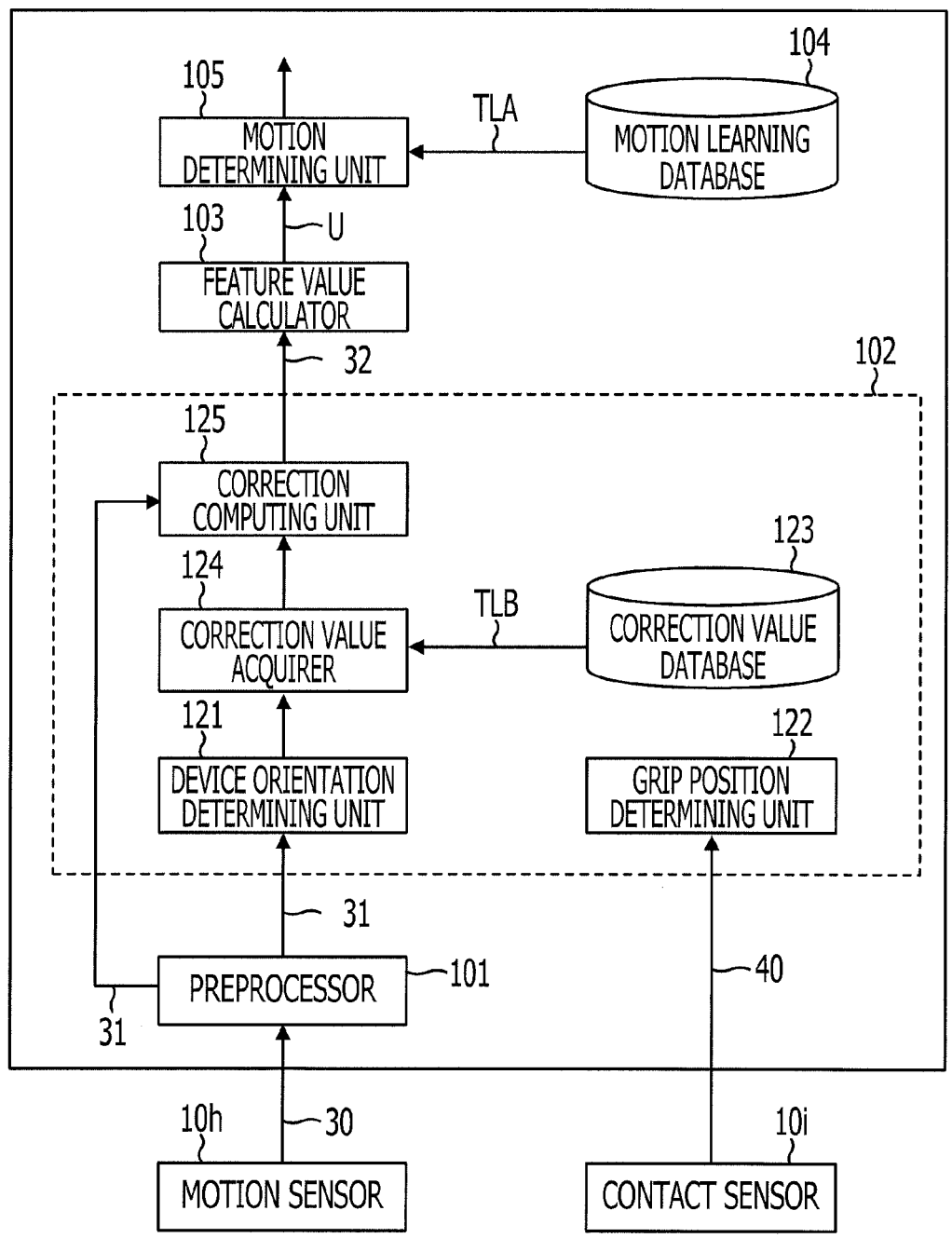
FIG. 6 illustrates an exemplary functional configuration of a mobile phone handset in the case where a first method is applied.
Figure 7:
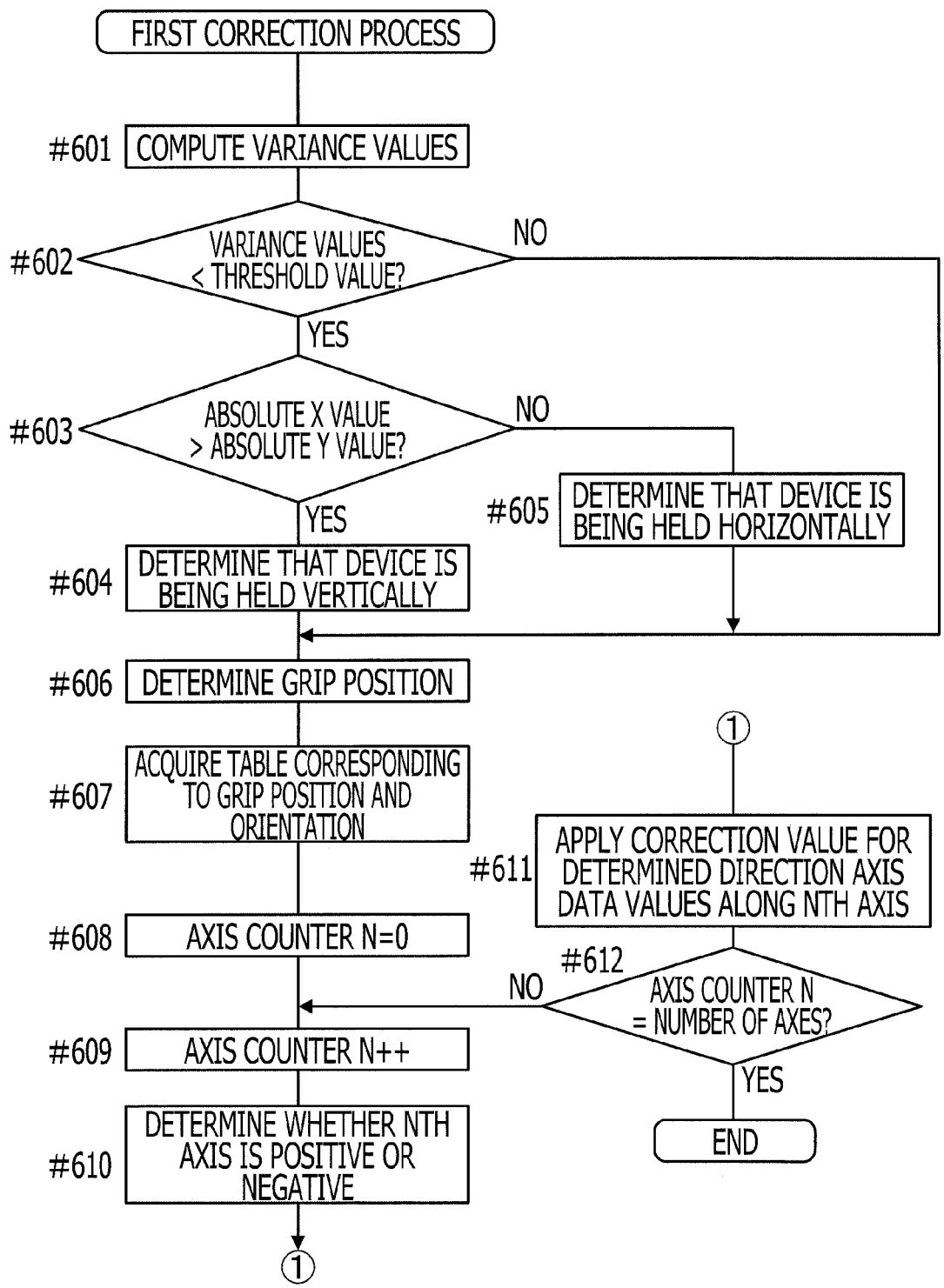
FIG. 7 is a flowchart explaining an exemplary flow of a first correction process.
Figure 8:
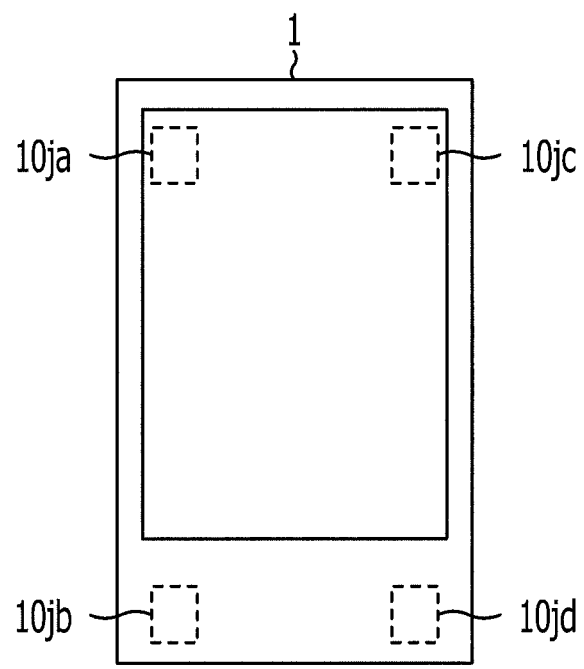
FIG. 8 illustrates exemplary motion sensor positions.

FIG. 6 illustrates an exemplary functional configuration of the mobile phone handset 1 in the case where a first method is applied. FIG. 7 is a flowchart explaining an exemplary flow of a first correction process. FIG. 8 illustrates exemplary positions of motion sensors 10ja to 10jd. FIGS. 9A to 9F illustrate exemplary correction value tables TLB.

As illustrated in FIG. 6, the variation data corrector 102 in FIG. 3 is provided with a device orientation determining unit 121, a grip position determining unit 122, a correction value database 123, a correction value acquirer 124, and a correction computing unit 125.

An acceleration sensor may be used for the motion sensor 10h. The motion sensor 10h measures the orientation of the mobile phone handset 1 and variation thereof, and generates variation data 30 indicating the measured results.

As described earlier, the contact sensor 10i detects which parts of the mobile phone handset 1 are being touched by the user's hands, and generates contact data 40 indicating the detected results.

As described earlier with reference to FIG. 3, the preprocessor 101 generates variation data 31 by conducting a process to remove noise from the variation data 30 generated by the motion sensor 10h.

The variation data 31 contains per-axis acceleration data for a fixed number of points in time. This data has been processed by the preprocessor 101.

The respective components of the variation data corrector 102 generate variation data 32 by correcting the variation data 31 according to the procedure indicated by the flowchart in FIG. 7.

The device orientation determining unit 121 computes a variance value for each of the X, Y, and Z axes expressed by the variation data 31 (FIG. 7, #601). If these variance values are all less than a threshold value (#602, Yes), then the device orientation determining unit 121 uses the variation data 31 as a basis for determining the orientation of the mobile phone handset 1 itself as follows (#603 to #605).

Figure 4A:
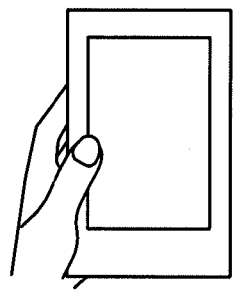
FIGS. 4A to 4F illustrate examples of the relative positions of a mobile phone handset and a user's hand.
Figure 4B:
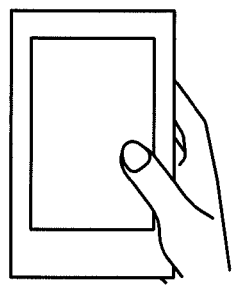
Figure 4C:
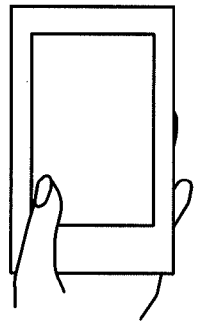
Figure 4D:
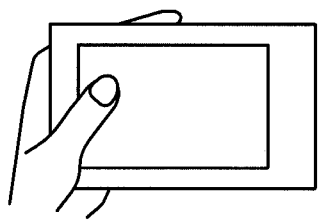
Figure 4E:
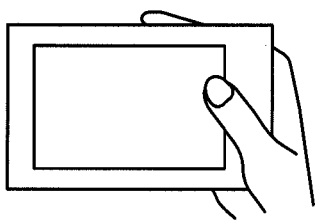
Figure 4F:
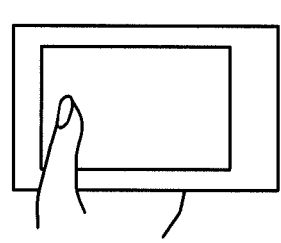

In the present embodiment, the device orientation determining unit 121 determines whether the mobile phone handset 1 is being held in a vertical orientation as illustrated in FIGS. 4A to 4C, or in a horizontal orientation as illustrated in FIGS. 4D to 4F. Thus, on the basis of the absolute values of the most recent accelerations along the X and Y axes as expressed by the variation data 31, the device orientation determining unit 121 determines whether the mobile phone handset 1 is in a vertical orientation or a horizontal orientation.

In other words, if the absolute value of the X axis acceleration is greater than the absolute value of the Y axis acceleration (#603, Yes), then the device orientation determining unit 121 determines that the mobile phone handset 1 is in a vertical orientation (#604). If not (#603, No), then the device orientation determining unit 121 determines that the mobile phone handset 1 is in a horizontal orientation (#605).

On the basis of the contact data 40 generated by the contact sensor 10i, the grip position determining unit 122 determines which parts (i.e. positions) of the mobile phone handset 1 are being touched and held by the user. In other words, the grip position determining unit 122 determines the contact positions between the user and the mobile phone handset 1 (#606). Hereinafter, these contact positions will be collectively referred to as the grip position.

As FIGS. 4A to 4F demonstrate, the user can touch different parts of the mobile phone handset 1 depending on how he or she holds the mobile phone handset 1.

Thus, grip data may be acquired in advance and registered as templates in the mobile phone handset 1. Such data indicates the touched parts (i.e., contact positions) of the mobile phone handset 1 for the cases when a person with normal-sized hands holds the mobile phone handset 1 using the respective grip positions (i.e., ways of holding the mobile phone handset 1) illustrated in FIGS. 4A to 4F. The grip position determining unit 122 may then match the contact positions expressed by the contact data 40 against the contact positions expressed by each template, and determine the current grip position to be the grip position corresponding to the best-matching template.

Hereinafter, the grip positions illustrated in FIGS. 4A and 4D will be referred to as left grips, the grip positions illustrated in FIGS. 4B and 4E will be referred to as right grips, and the grip positions illustrated in FIGS. 4C and 4F will be referred to as bottom grips.

Alternatively, motion sensors may be provided at a plurality of locations on the mobile phone handset 1 instead of the contact sensor 10i, and data obtained from such motion sensors may be used as a basis for determining both the grip position and the orientation of the mobile phone handset 1. For example, motion sensors 10ja to 10jd may be provided as illustrated in FIG. 8, with one motion sensor provided at each of the four corners of the mobile phone handset 1 as viewed from the front. When the user is holding the mobile phone handset 1 normally, he or she will unconsciously move the mobile phone handset 1. At that point, the motion of the mobile phone handset 1 will be small near the positions that the user is holding, with the magnitude of the motion increasing as the distance from the user's grip increases.

Consequently, the order of the motion sensors according to the magnitude of the variation in their data will be different for each of the respective grip positions and orientations illustrated in FIGS. 4A to 4F. For example, when the user is holding the mobile phone handset 1 in a vertical orientation with the left hand as illustrated in FIG. 4A, the order of the motion sensors by variation from smallest to largest will become 10jb, 10jd, 10ja, 10jc. In other words, if the respective data from the motion sensors can be ordered by variation from smallest to largest in the order 10jb, 10jd, 10ja 10jc, then it can be determined that the user is holding the mobile phone handset 1 in a vertical orientation with the left hand.

In this way, by detecting the order of the motion sensors according to the magnitude of the variation in their data, the grip position and orientation of the mobile phone handset 1 can be determined.

It should be appreciated that any one of the motion sensors 10ja to 10jd may also function as the motion sensor 10h. Moreover, the positions of the motion sensors 10ja to 10jd are not limited to the four corners. For example, the motion sensors 10ja to 10jd may also be provided near the midpoint along each edge of the mobile phone handset 1.

Meanwhile, as described earlier, different features will be expressed in the variation data 31 depending on how the mobile phone handset 1 is held (i.e., depending on the user's grip). Thus, in order to reduce the influence of the user's grip, values are prepared for each grip and stored in the correction value database 123. These values are used in computational processes hereinafter described, which are configured to correct the variation data 31. (Hereinafter, these values will be referred to as correction values).

In the first method, correction value tables TLB (TLB1 to TLB6) are stored in the correction value database 123, with one table for each combination of a particular orientation and a particular grip position, as illustrated in FIGS. 9A to 9F. In each correction value table TLB, six correction values are expressed, and the usage of these values will be described later.

Returning to FIGS. 3 and 7, the correction value acquirer 124 acquires, from the correction value database 123, the correction value table TLB that corresponds to both the grip position that was determined by the grip position determining unit 122, as well as to the orientation that was determined by the device orientation determining unit 121 (#607). For example, if the grip position has been determined to be a left grip, and if the orientation has been determined to be a vertical orientation, then the correction value acquirer 124 will acquire the correction value table TLB1 illustrated in FIG. 9A.

In this way, in the case where the per-axis components of the feature value computed in operation #601 are all less than a threshold value, the device orientation determining unit 121 determines the orientation of the mobile phone handset 1 itself. This threshold value is a value approximating the state wherein the mobile phone handset 1 may be regarded as being stationary. In other words, the threshold value is a value near zero. Thus, the device orientation determining unit 121 determines the orientation of the mobile phone handset 1 when the user is not performing a motion with respect to the mobile phone handset 1. However, in cases where the orientation has not yet been evaluated, such as immediately after powering on the mobile phone handset 1, the device orientation determining unit 121 may determine the orientation regardless of whether or not the feature value satisfies the threshold value. On the basis of the most recent determination results from both the device orientation determining unit 121 and the grip position determining unit 122, the correction value acquirer 124 acquires a correction value table TLB. Consequently, even if the orientation changes after a motion, a suitable correction value table TLB can be re-acquired.

On the basis of the most recently acquired correction value table TLB, the correction computing unit 125 conducts computational processes to correct the variation data 31 as follows (#608 to #612).

In each correction value table TLB, a pair of positive (+) and negative (−) direction correction values are expressed for each of the X, Y, and Z axes.

The correction computing unit 125 corrects the variation data 31 and generates variation data 32 by evaluating the following Eq. 1:

$$(Qxt, Qyt, Qzt) = (Pxt \times Kx, Pyt \times Ky, Pzt \times Kz) \tag{1}$$

wherein Pxt, Pyt, and Pzt are the respective X, Y, and Z axis accelerations at a time t as expressed in the variation data 31. Kx is the X axis correction value expressed in the acquired correction value table TLB, with the positive (+) direction correction value being used when Pxt is equal to or greater than 0, and the negative (−) direction correction value being used when Pxt is less than 0. Similarly, Ky is the Y axis correction value expressed in the acquired correction value table TLB, with the positive (+) direction correction value being used when Pyt is equal to or greater than 0, and the negative (−) direction correction value being used when Pyt is less than 0. Kz is the Z axis correction value expressed in the acquired correction value table TLB, with the positive (+) direction correction value being used when Pzt is equal to or greater than 0, and the negative (−) direction correction value being used when Pzt is less than 0. Qxt, Qyt, and Qzt are the corrected values for Pxt, Pyt, and Pzt, respectively.

By way of example, consider the case wherein it has been determined that the orientation of the mobile phone handset 1 is vertical and that the grip position is left, and furthermore wherein the user has moved the mobile phone handset 1 from right to left along the Y axis with a sliding (i.e., parallel) motion. At this point, assume that the variation data 31 contains data indicating the following accelerations: (ax, ay, az)= (0.047, 0.138, 0.173). In cases like the above, the correction value acquirer 124 acquires the correction value table TLB1 illustrated in FIG. 9A. Subsequently, the correction computing unit 125 selects correction values on the basis of the sign of the respective accelerations along the X, Y, and Z axes, and executes a process to compute the following new accelerations: (a'x, a'y, a'z)=(0.047×1.5, 0.138×1.5, 0.173×1)=(0.071, 0.207, 0.173). In so doing, the correction computing unit 125 corrects the accelerations (ax, ay, az) to obtain the corrected accelerations (a'x, a'y, a'z).

As the exemplary computational results given above demonstrate, when the grip position is left, acceleration along the positive (+) Y axis direction is emphasized by the correction computing unit 125.

In this way, the correction computing unit 125 generates variation data 32 by correcting the X, Y, and Z axis accelerations for particular points in time as expressed by the variation data 31.

Herein, it should be appreciated the second through the fifth methods described hereinafter may similarly re-acquire correction values as appropriate, and conduct correction using the most recent correction values.

On the basis of the variation data 32 obtained by the correction computing unit 125, the feature value calculator 103 computes the feature value U. On the basis of the feature value U as well as the motion lookup table TLA (see FIG. 5), the motion determining unit 105 determines the motion that has been performed with respect to the mobile phone handset 1.

As described above, when the grip position is left, the correction computing unit 125 generates variation data 32 wherein acceleration along the positive (+) Y axis direction has been emphasized. Consequently, the motion determining unit 105 is able to more reliably detect sliding motions of the mobile phone handset 1 to the right and sliding motions of the mobile phone handset 1 to the left compared to the related art.

According to the respective correction values for the individual combinations prepared in the correction value tables TLB, the variation data is corrected such that variation is increased along an axis where large variation is expected (one or more determination or target axis), even when the mobile phone handset 1 can be determined to be sliding along other axes.

Moreover, depending on the grip position, variation along the axis where large variation is expected might not be significantly expressed compared to the variation with other grip positions. However, according to the correction values for the individual combinations prepared in the correction value tables TLB, the variation data can be more properly corrected compared to the related art.

For example, if a device is slid to the left while gripped vertically with the left hand, a large variation (i.e., acceleration) in the data for the positive (+) Y axis direction would be expected. However, since the direction of motion might be deemed difficult for the user based upon one or more factors, such as gesture recognition history, user profile, location, shake of the mobile phone handset 1, or any combinations thereof, there may be cases where large variation does not occur, and the motion determining unit 105 is unable to make a correct determination. However, according to the first method, the data values for the axis crucial to the determination are increased by the variation data corrector 102. In so doing, the motion determining unit 105 is able to make a correct determination, even when the user holds the mobile phone handset 1 with a grip position that makes the particular motion difficult.

[Second Method for Correcting Variation Data 31]

Figure 10:
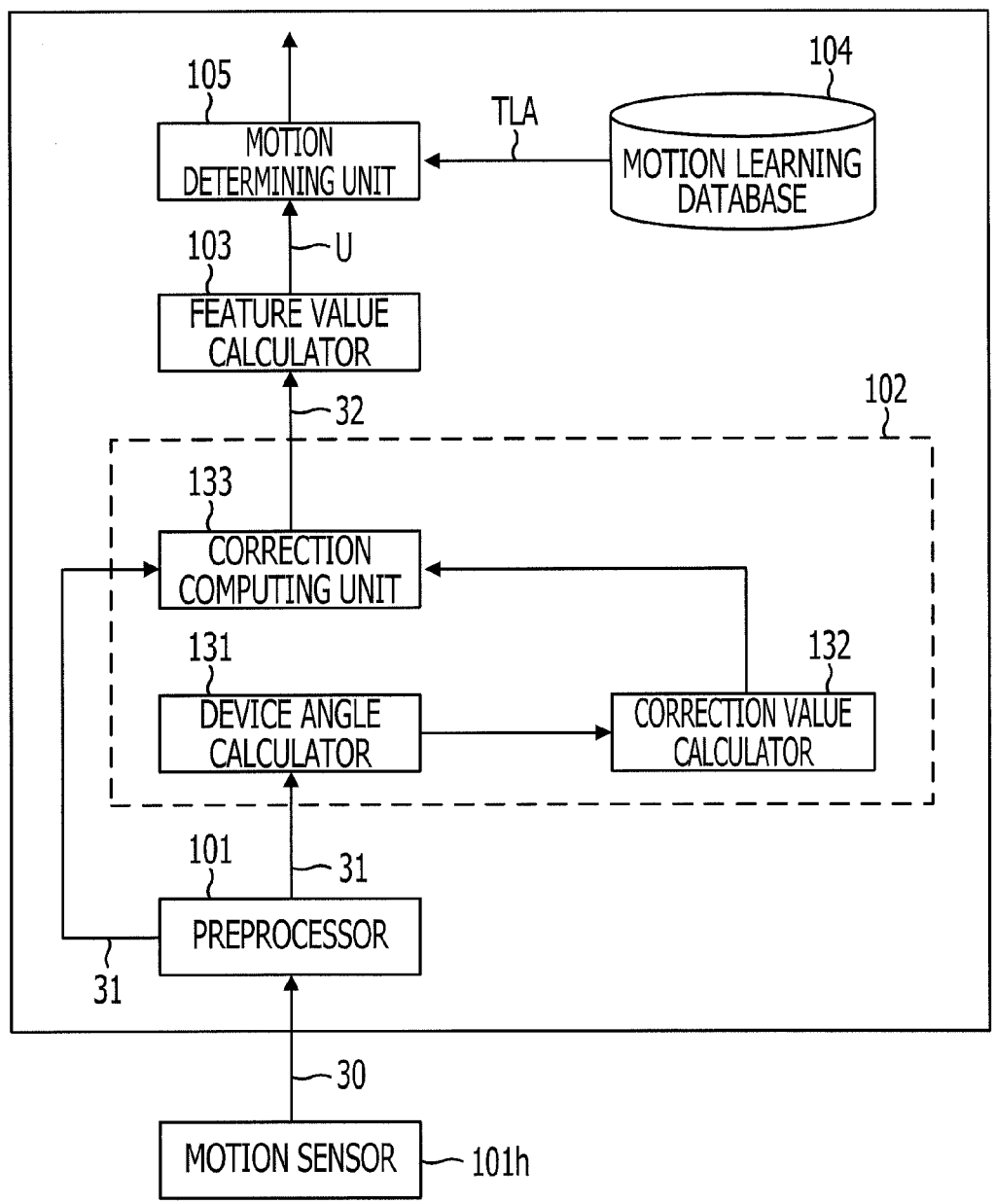
FIG. 10 illustrates an exemplary functional configuration of a mobile phone handset in the case where a second method is applied.
Figure 11:
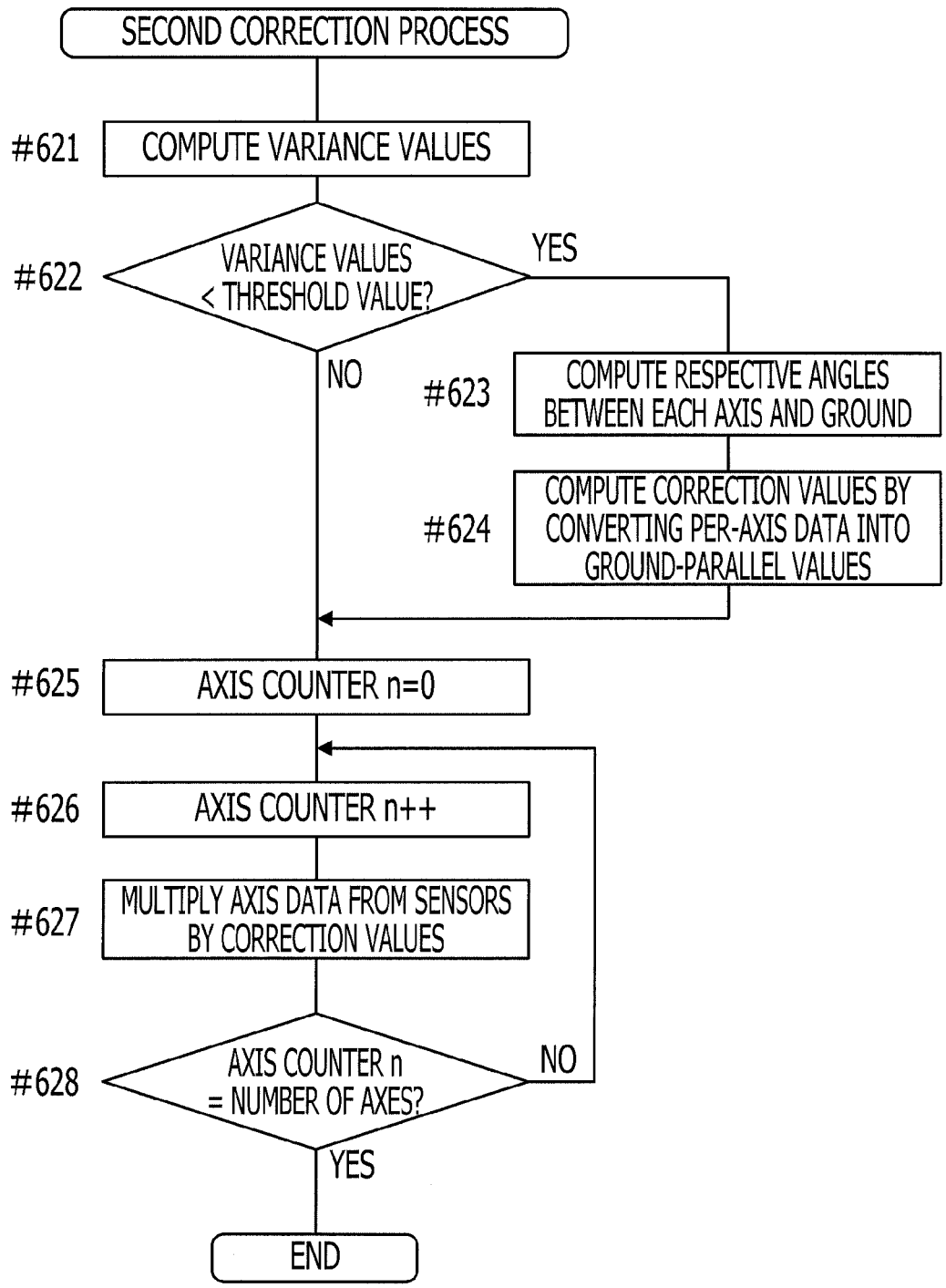
FIG. 11 is a flowchart explaining an exemplary flow of a second correction process.

FIG. 10 illustrates an exemplary functional configuration of the mobile phone handset 1 in the case where a second method is applied. FIG. 11 is a flowchart explaining an exemplary flow of a second correction process.

As illustrated in FIG. 10, the variation data corrector 102 in FIG. 3 is provided with a device angle calculator 131, a correction value calculator 132, and a correction computing unit 133.

An acceleration sensor may be used for the motion sensor 106h. The motion sensor 10h measures the orientation of the mobile phone handset 1 and variation thereof (i.e., per-axis accelerations at particular points in time), and generates variation data 30 indicating the measured results.

Similarly to the first method, the preprocessor 101 conducts a process to remove noise from the variation data 30. As a result, variation data 31 is obtained. Similarly to the first method, the variation data 31 contains per-axis acceleration data for a fixed number of points in time, the data having been processed by the preprocessor 101.

The respective components of the variation data corrector 102 generate variation data 32 by correcting the variation data 31 according to the procedure indicated by the flowchart in FIG. 11.

The device angle calculator 131 computes a variance value for each of the X, Y, and Z axes expressed by the variation data 31 (FIG. 11, #621). If these variance values are all less than a threshold value (#622, Yes), then the device angle calculator 131 computes a surface (e.g., ground)-relative angles θxt, θyt, and θzt for each of the X, Y, and Z axes as follows (#623).

Typically, gravitational acceleration is an acceleration pointing vertically downward with a magnitude of 1 G (approximately 9.8 m/s$^2$). The motion sensor 10h is responsive to gravity, but produces no acceleration other than gravitational acceleration if stationary. Thus, if it is determined that the mobile phone handset 1 is stationary (i.e., if the above variance values are all less than the threshold value), then the respective X, Y, and Z axis accelerations Px, Py, and Pz for a given point in time as expressed in the variation data 31 satisfy the following relationships: Px=1 G×sin(θx); Py=1 G×sin(θy); and Pz=1 G×sin(θz).

The device angle calculator 131 computes θx, θy, and θz by using the arcsine (arcsin) function.

For example, if given respective Px, Py, and Pz values of 0.64, −0.06, and 0.76, then according to this calculation method, the angles θx, θy, and θz become approximately 40°, 0°, and 50°, respectively.

The correction value calculator 132 uses the angles computed by the device angle calculator 131 to compute correction values as follows (#624). These correction values are used to compute the vertically downward components of the X, Y, and Z axis accelerations expressed in the variation data 31.

If θx, θy, and θz are the angles computed by the device angle calculator 131 when the mobile phone handset 1 is determined to be stationary, then cos(θx), cos(θy), and cos(θz) are computed as the respective correction values for the X, Y, and Z axes. For example, assume that when the mobile phone handset 1 is determined to be stationary, the X, Y, and Z axis accelerations Pxt, Pyt, and Pzt are 0.64, −0.06, and 0.76. In this case, as described earlier, θx, θy, and θz become approximately 40°, 0°, and 50°, respectively. Thus, the X, Y, and Z axis correction values become approximately cos 40°=0.77, cos 0°=1, and cos 50°=0.64, respectively.

The second method is thus similar to the first method, in that the device angle calculator 131 and the correction value calculator 132 conducts processes to compute correction values when the per-axis components of the feature value computed in operation #621 are all less than the threshold value (i.e., when the user is not performing a motion with respect to the mobile phone handset 1). Consequently, even if the orientation changes after a motion, suitable correction values can be re-computed.

The correction computing unit 133 corrects the variation data by taking the respective X, Y, and Z axis accelerations expressed by the variation data 31, and multiplying the data by the most recent per-axis correction values computed by the correction value calculator 132 (#625 to #628).

For example, if the accelerations Px, Py, and Pz for a stationary state are 0.64, −0.06, and 0.76, then as described above, the correction values for the X, Y, and Z axes become 0.77, 1, and 0.64, respectively. Thus, the accelerations are respectively corrected as follows: 0.64×0.77=0.49; −0.06× 1=−0.06; and 0.76×0.64=0.48.

Additionally, assume that the user subsequently moves the mobile phone handset 1 from right to left along the Y axis with a sliding (i.e., parallel) motion. Assume that the accelerations Pxt, Pyt, and Pzt for a time t during the motion were 0.047, 0.138, and 0.173. Correcting these accelerations with the above calculation method yields 0.047×0.77=0.036, 0.138× 1=0.138, and 0.173×0.64=0.11, thus demonstrating that the data for the positive (+) Y axis direction is changed so as to be more prominent than the data for the other axes.

In this way, the correction computing unit 133 generates variation data 32 by correcting the X, Y, and Z axis accelerations for particular points in time as expressed by the variation data 31.

On the basis of the variation data 32 obtained by the correction computing unit 133, the feature value calculator 103 computes the feature value U. On the basis of the feature value U as well as the motion lookup table TLA (see FIG. 5), the motion determining unit 105 determines the motion that has been performed with respect to the mobile phone handset 1.

Normally, if the user holds the mobile phone handset 1 vertically or horizontally (i.e., if the mobile phone handset 1 is upright or on its side), then only one axis among the X, Y, and Z axes will vary significantly when the mobile phone handset 1 is moved in a parallel motion (this axis can be the determination or target axis). According to the second method, the variation data 31 is corrected to obtain variation data 32 wherein acceleration along this determination axis has been emphasized. For this reason, the motions corresponding to such movement of the mobile phone handset 1 can be determined more reliably compared to the related art.

In addition, even when the user intends to move the mobile phone handset 1 in a parallel motion along only one axis among the X, Y, and Z axes, in practice movement will also normally occur in a positive (+) or negative (−) direction along the remaining axes. Such secondary movement can easily occur in cases where, for example, the user moves the mobile phone handset 1 while holding the mobile phone handset 1 with its display screen tilted vertically. However, according to the second method, the axis components can be emphasized for the axis that corresponds to the direction of the user's intended movement. For this reason, the user's desired motion can be determined more reliably compared to the related art. In other words, individual differences in grips (i.e., individual differences in the angle at which the mobile phone handset 1 is held relative to the ground) can be eliminated, thereby making it possible to more easily ascertain the axis that is crucial to the determination, and correctly recognize motions.

[Third Method for Correcting Variation Data 31]

Figure 12:
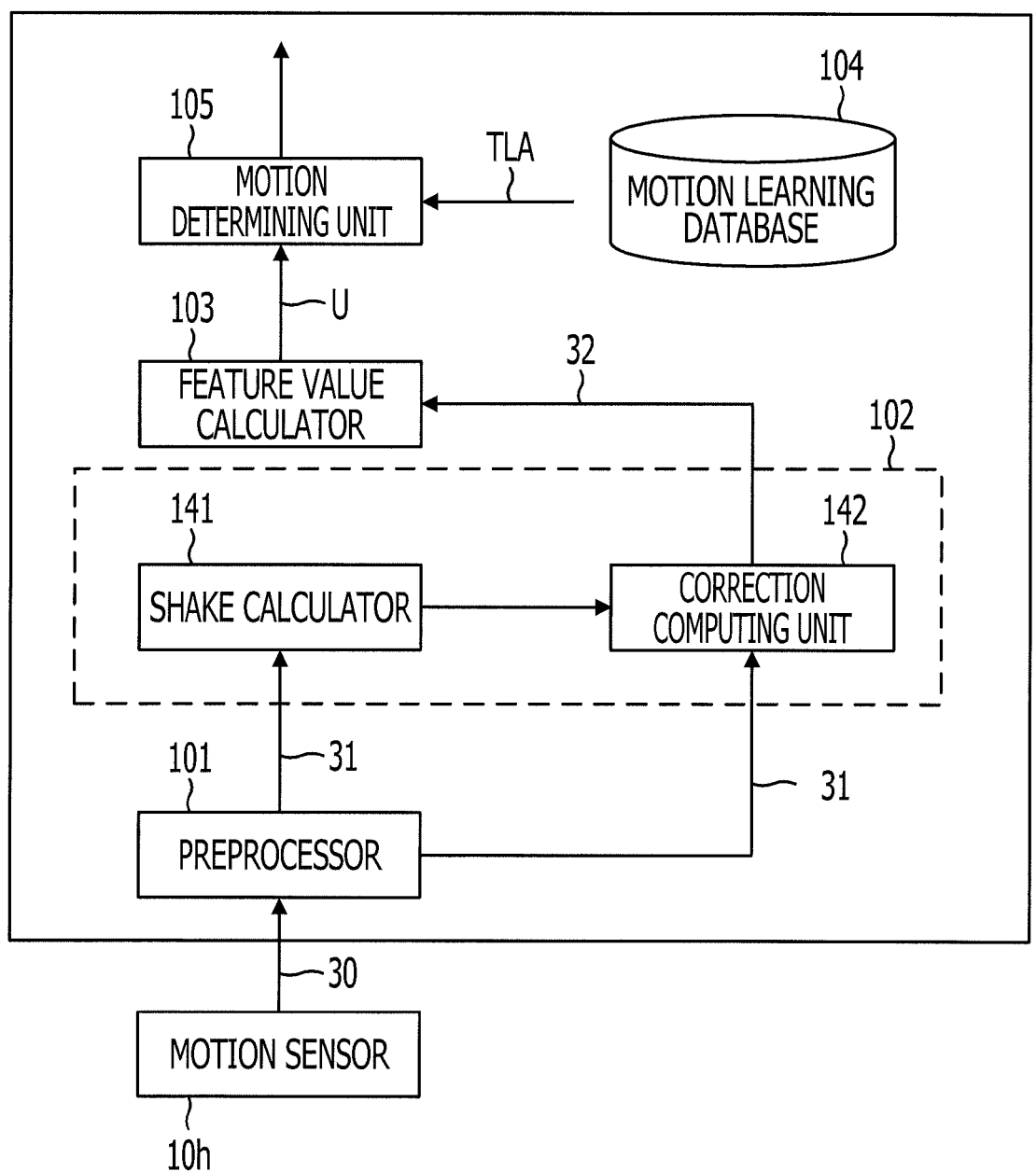
FIG. 12 illustrates an exemplary functional configuration of a mobile phone handset in the case where a third method is applied.
Figure 13:
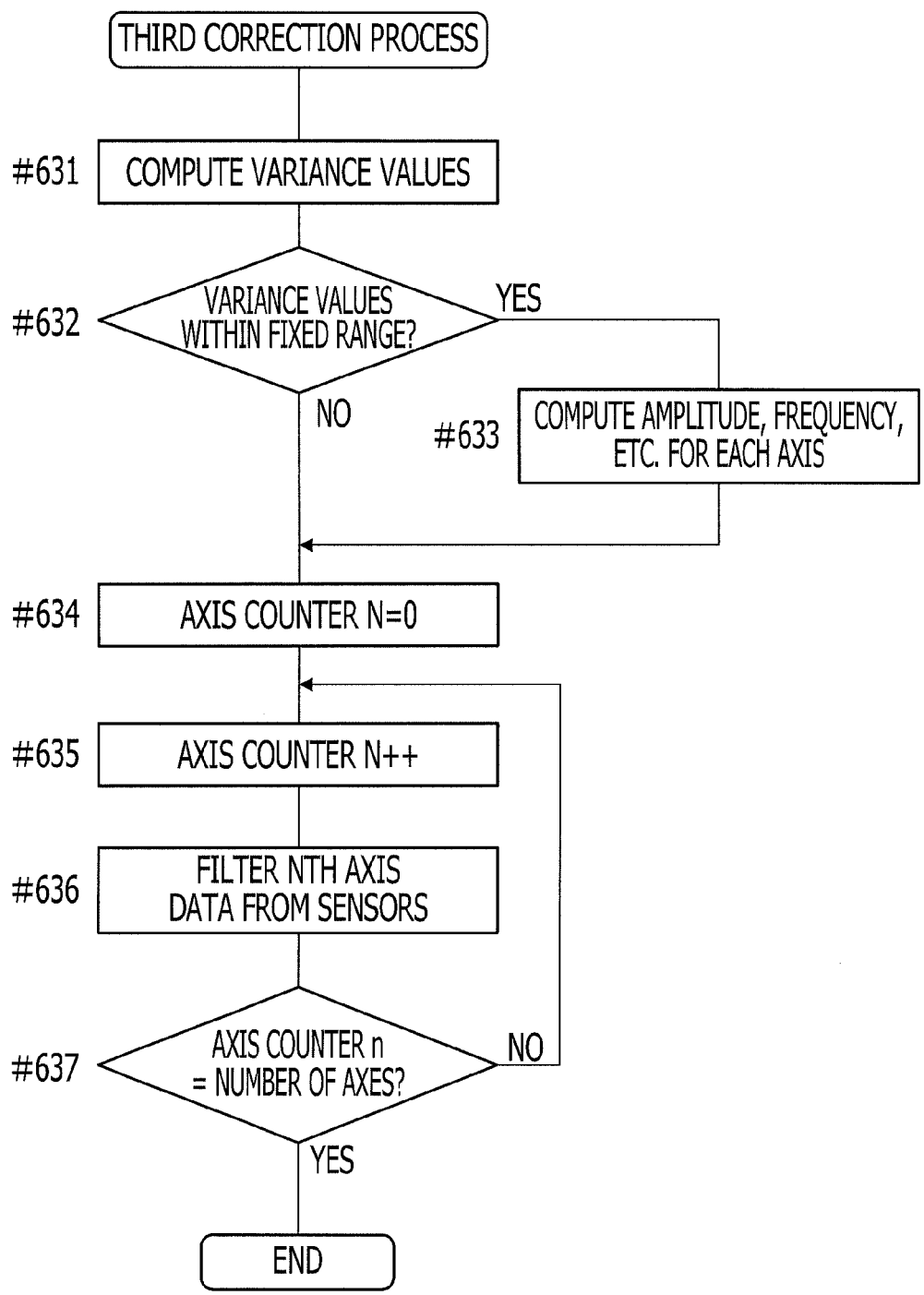
FIG. 13 is a flowchart explaining an exemplary flow of a third correction process.

FIG. 12 illustrates an exemplary functional configuration of the mobile phone handset 1 in the case where a third method is applied. FIG. 13 is a flowchart explaining an exemplary flow of a third correction process.

The motion sensor 10h in the mobile phone handset 1 is primarily configured to not detect accelerations or other variation that the user is not performing as a motion-based operation. However, in practice, shake will occur simply because of the user holding the mobile phone handset 1. Such shake causes the mobile phone handset 1 to move, and the motion sensor 10h will detect variation. Furthermore, shake will also occur when the user is walking or on board a train or other vehicle. Thus, the mobile phone handset 1 will move, and the motion sensor 10h will detect variation.

According to the third method, a process is conducted to remove from the variation data 31 the features of the shake that is constantly produced even when the user is not performing a motion with respect to the mobile phone handset 1, thereby making it possible to prevent misrecognition of motions.

As illustrated in FIG. 12, the variation data corrector 102 in FIG. 3 is provided with a shake calculator 141 and a correction computing unit 142.

An acceleration sensor may be used for the motion sensor 10h. The motion sensor 10h measures the orientation of the mobile phone handset 1 and variation thereof (i.e., per-axis accelerations at particular points in time), and generates variation data 30 indicating the measured results.

Similarly to the first and second methods, the preprocessor 101 conducts a process to remove noise from the variation data 30. As a result, variation data 31 is obtained. Similarly to the first and second methods, the variation data 31 contains per-axis acceleration data for a fixed number of points in time, the data having been processed by the preprocessor 101.

The respective components of the variation data corrector 102 generate variation data 32 by correcting the variation data 31 according to the procedure indicated by the flowchart in FIG. 13.

The shake calculator 141 computes a variance value for each of the X, Y, and Z axes expressed by the variation data 31 (FIG. 13, #631). If the respective per-axis variance values are within a fixed range of values (#632, Yes), then the device angle calculator 131 computes the positive and negative amplitudes of a wave that represents the respective acceleration variations along each of the X, Y, and Z axes expressed by the variation data 31. In addition, the device angle calculator 131 also computes the total amplitude and frequency of this wave (#633). In other words, the device angle calculator 131 detects the acceleration variation producing the shake, and computes the state of the shake.

Herein, the total amplitude refers to the distance between the positive peak value (amplitude) and the negative peak value (amplitude). Consequently, the total amplitude can be computed by subtracting the negative peak value from the positive peak value. For example, the total amplitude along the X axis can be computed by subtracting the negative X axis peak value from the positive X axis peak value expressed by the variation data 31.

Gravitational acceleration exists in a relationship with the total amplitude and frequency as expressed by the following Eq. 2.

$$\text{Gravitational acceleration } [G] = (\text{Total amplitude}/2) \times 10^{-3} \times (2\pi \times \text{Frequency})^2 \times (1/9.8) \quad (2)$$

Thus, the respective frequencies fx, fy, and fz for the X, Y, and Z axes can be computed by means of the following Eq. 3.

$$fx = (\tfrac{1}{2})n \times ((ax/Lx) \times 2 \times 10^3 \times 9.8)^{1/2} \quad (3)$$

In the above Eq. 3, ax represents the acceleration along the X axis, and Lx represents the total amplitude along the X axis.

The frequency may be computed separately for each axis, but since the per-axis frequencies are usually the same, the frequency may be computed for just one of the axes. Alternatively, the frequency may be computed by counting the number of positive or negative peak values observed in one second.

Although the generated data thus computed by the shake calculator 141 is not a set of coefficients like those used in the first and second methods, as explained in the following, this data can be used to correct the variation data 31. For this reason, the data computed by the shake calculator 141 will also be hereinafter referred to as correction values.

The correction computing unit 142 applies a filter to the wave that represents the respective acceleration variations along the X, Y, and Z axes expressed by the variation data 31. The filter is applied by using the frequency or the respective X, Y, and Z axis amplitudes that were computed by the shake calculator 141 (#634 to #637).

For example, if the amplitudes are used, then the correction computing unit 142 corrects the per-axis accelerations as follows. Positive accelerations expressed by the variation data 31 that are less than the positive amplitude are corrected to 0 (zero), while all other positive accelerations are corrected by subtracting the positive amplitude therefrom. For example, positive X axis accelerations that are less than the positive amplitude are corrected to 0, while all other positive X axis accelerations are corrected by subtracting the positive X axis amplitude therefrom.

Negative accelerations are similarly corrected. In other words, negative accelerations expressed by the variation data 31 that are less than the negative amplitude are corrected to 0, while all other negative accelerations are corrected by subtracting the negative amplitude therefrom.

On the other hand, if the frequency is used, then the correction computing unit 142 corrects the per-axis accelerations as follows. From the wave that represents the respective acceleration variations along the X, Y, and Z axes as expressed by the variation data 31, the acceleration is corrected to 0 at the parts of the wave where the wave frequency approximately matches the frequency computed by the shake calculator 141. In other words, the acceleration is corrected to 0 at the parts of the wave where the difference in frequency is less than a predetermined value. All other parts of the wave are kept the same.

Alternatively, if the wave expressed by the variation data 31 has a high frequency, then the variation data 31 may also be corrected by using an LPF.

In this way, in cases where there exists shake that is constantly produced, such as when the user is walking or on board a train, the features of such shake are removed from the variation data 31 by means of the correction computing unit 142. Variation data 31 that has been corrected by removing such shake becomes the variation data 32.

On the basis of the variation data 32 obtained by the correction computing unit 142, the feature value calculator 103 computes a feature value U. On the basis of the feature value U as well as the motion lookup table TLA (see FIG. 5), the motion determining unit 105 determines the motion that has been performed with respect to the mobile phone handset 1.

[Fourth Method for Correcting Variation Data 31]

Figure 14:
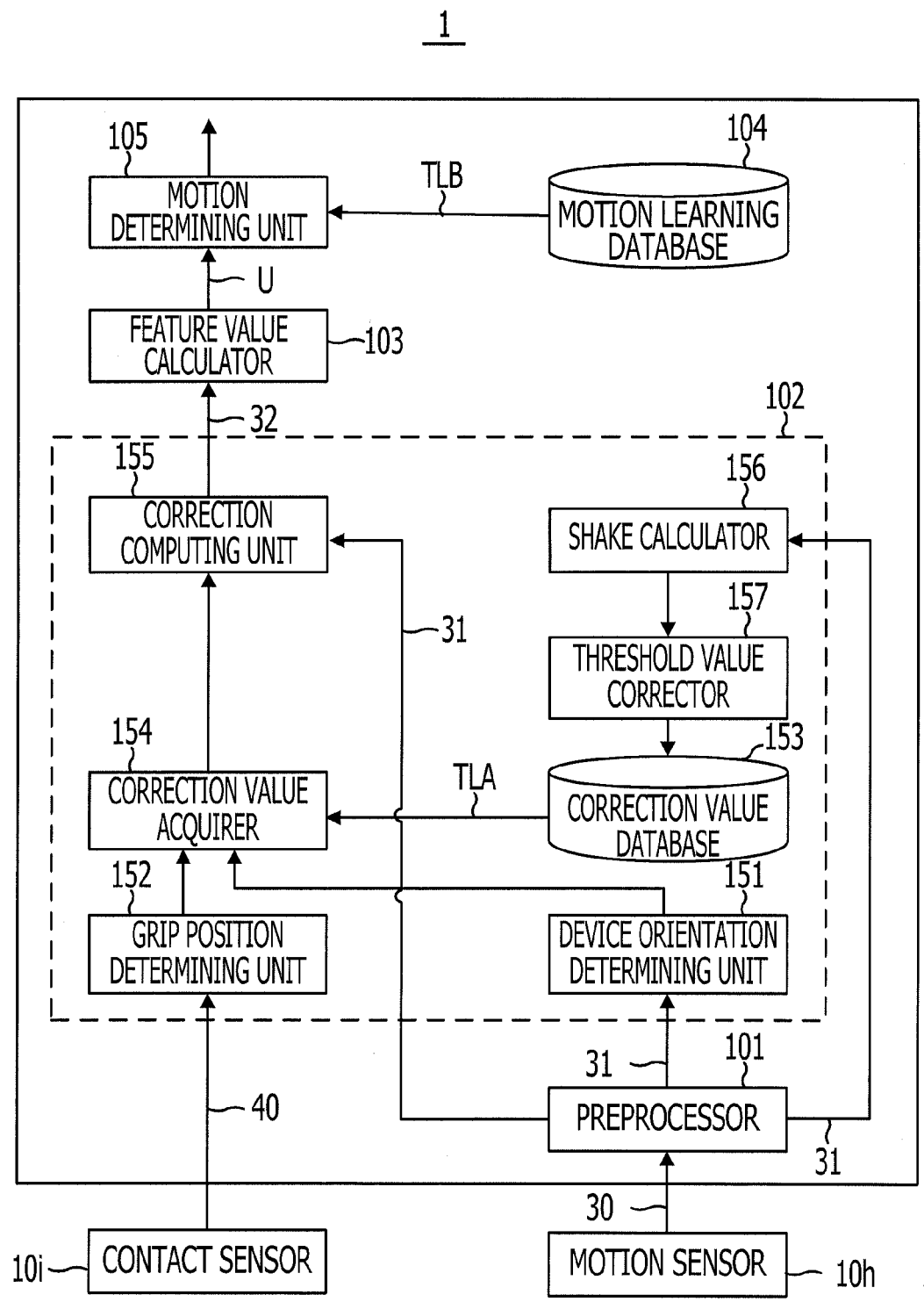
FIG. 14 illustrates an exemplary functional configuration of a mobile phone handset in the case where a fourth method is applied.
Figure 15:
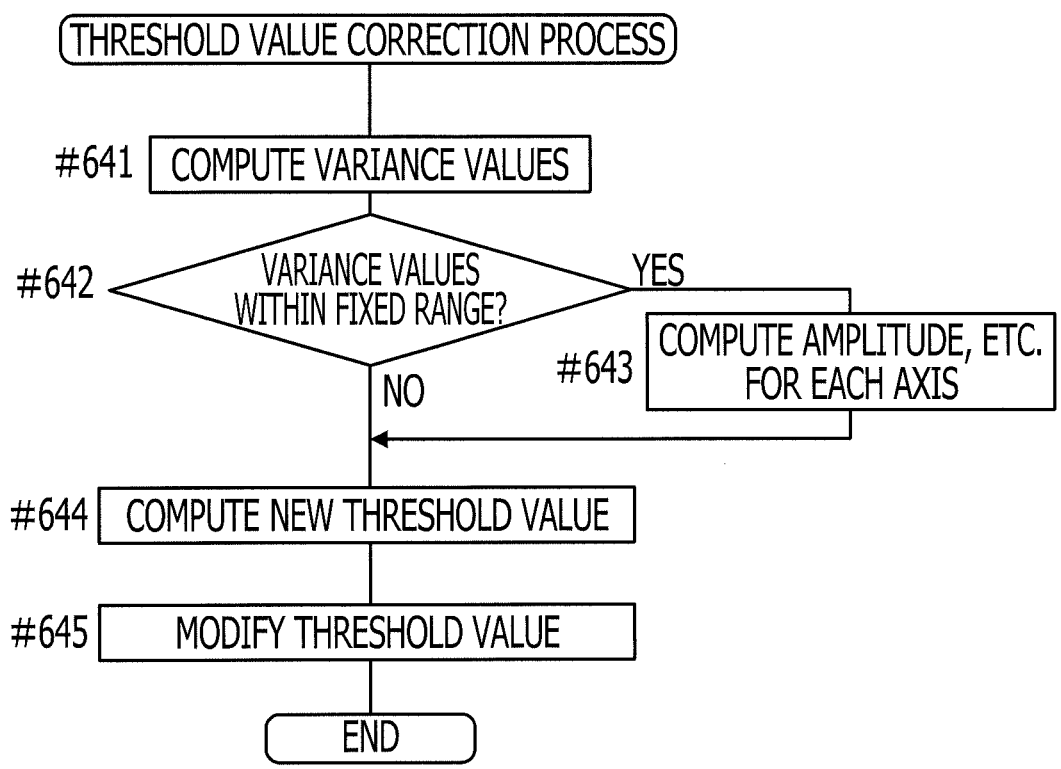
FIG. 15 is a flowchart explaining an exemplary flow of a threshold value correction process.
Figure 16:
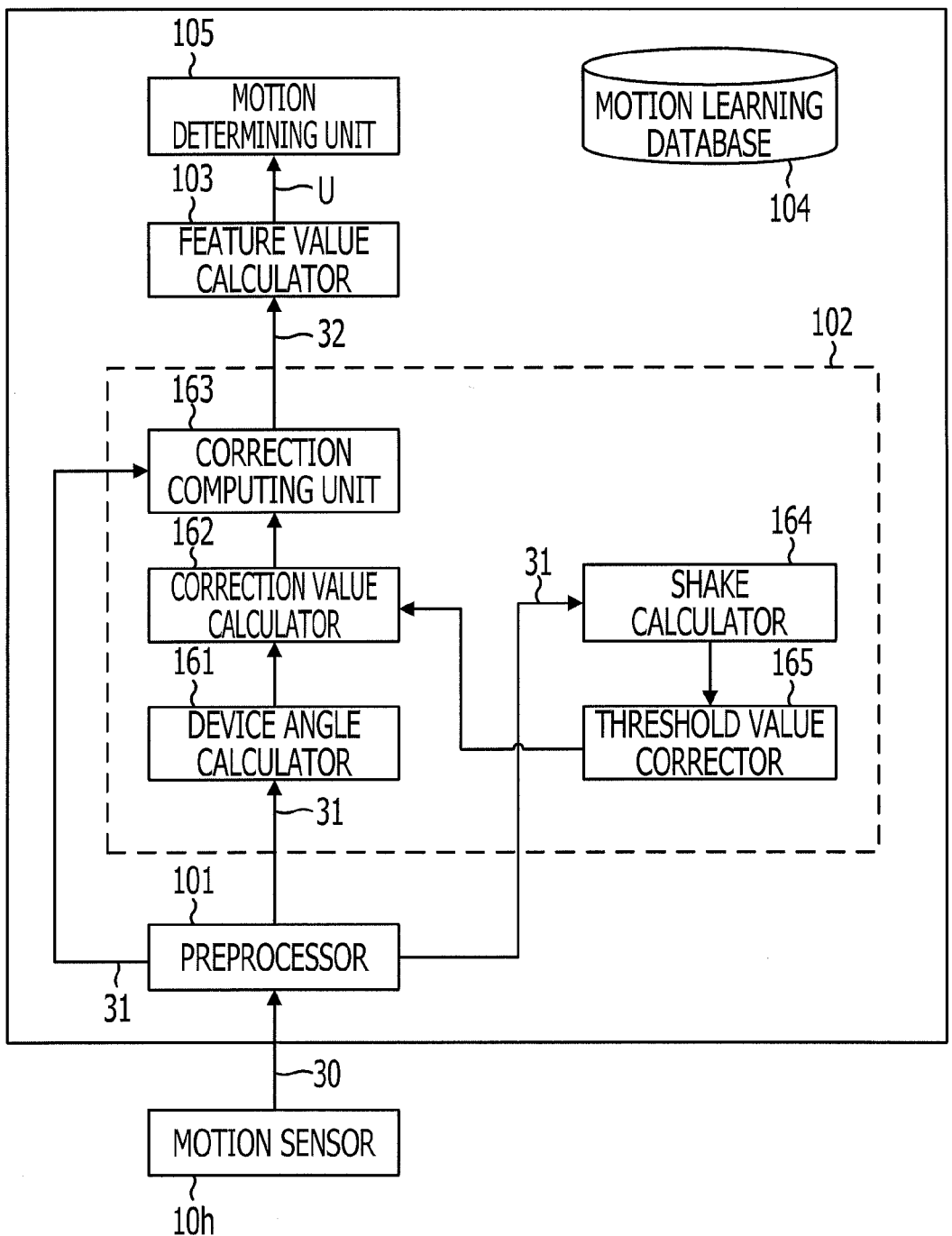
FIG. 16 illustrates an exemplary modification of the functional configuration of a mobile phone handset in the case where the fourth method is applied.

FIG. 14 illustrates an exemplary functional configuration of the mobile phone handset 1 in the case where a fourth method is applied. FIG. 15 is a flowchart explaining an exemplary flow of a threshold value correction process. FIG. 16 illustrates an exemplary modification of the functional configuration of the mobile phone handset 1 in the case where the fourth method is applied.

In the first and second methods, when the user is simply holding the mobile phone handset 1 and not performing a motion, a correction value table TLB is acquired, and/or correction values are computed, based upon one or more factors, such as gesture recognition history, user profile, location, shake of the mobile phone handset 1, or any combinations thereof. In addition, it is assumed that the user is not walking or on board a train, for example.

However, even if the above assumption is true, constant shake may be produced in the mobile phone handset 1 in some cases, as a result of the particular ways the user moves his or her body. In such cases, the use of the first or second method to acquire a correction value table TLB and/or compute correction values may not yield satisfactory results.

Consequently, in the fourth method, a process is conducted to more reliably detect whether the user is simply holding the mobile phone handset 1 and not performing a motion, even when constant shake is being produced. Once the user has been detected as simply holding the mobile phone handset 1, a correction value table TLB is acquired and/or correction values are computed.

As illustrated in FIG. 14, the variation data corrector 102 in FIG. 3 is provided with a device orientation determining unit 151, a grip position determining unit 152, a correction value database 153, a correction value acquirer 154, a correction computing unit 155, a shake calculator 156, and a threshold value corrector 157. Hereinafter, features that are also common to the first, second, or third embodiments will be omitted from the description.

The respective components of the variation data corrector 102 generate variation data 32 by correcting the variation data 31 according to the procedure indicated by the flowchart in FIG. 15.

Similarly to the shake calculator 141 in the third method (see FIG. 12), the shake calculator 156 computes a variance value for each of the X, Y, and Z axes expressed by the variation data 31 (FIG. 15, #641). If the respective per-axis variance values are within a fixed range of values (#642, Yes), then the shake calculator 141 computes the positive amplitude, negative amplitude, total amplitude, and frequency of a wave that represents the respective acceleration variations along each of the X, Y, and Z axes expressed by the variation data 31 (#643). In other words, the shake calculator 141 computes the shake produced by the acceleration variation.

Meanwhile, and similarly to the first method, the respective components of the variation data corrector 102 generate variation data 32 by correcting the variation data 31 according to the procedure indicated by the flowchart in FIG. 7. For example, similarly to the device orientation determining unit 121 in the first method (see FIG. 6), the device orientation determining unit 151 computes a variance value for each of the X, Y, and Z axes expressed by the variation data 31 (FIG. 7, #601). If these variance values are all less than a threshold value (#602, Yes), then the device orientation determining unit 151 computes the orientation of the mobile phone handset 1 itself on the basis of the variation data 31 (#603 to #605). The processing executed by the feature value calculator 103 and subsequent processing is similar to that of the first method.

However, in the fourth method, the threshold value used in operation #602 is corrected in advance according to the amplitudes computed by the shake calculator 156 (#644, #645). This correction is executed by the threshold value corrector 157 as follows.

For example, the threshold value corrector 157 may set the threshold value equal to the positive amplitude. The threshold value may also be set equal to the negative amplitude, or equal to ½ the total amplitude. Alternatively, the threshold value may be set equal to the positive amplitude, the negative amplitude, or the total amplitude multiplied by a factor α (where α>1, such as α=1.5).

Alternatively, the variation data corrector 102 in FIG. 3 may be provided with a device angle calculator 161, a correction value calculator 162, a correction computing unit 163, a shake calculator 164, and a threshold value corrector 165, as illustrated in FIG. 16.

The device angle calculator 161, the correction value calculator 162, and the correction computing unit 163 respectively execute processing similar to that of the device angle calculator 131, the correction value calculator 132, and the correction computing unit 133 in the second method (see FIG. 10). In other words, a process for computing correction values is conducted according to the flowchart in FIG. 11. However, the threshold value used in operation #622 in this case is corrected by the shake calculator 164 and the threshold value corrector 165.

The shake calculator 164 and the threshold value corrector 165 respectively fulfill roles similar to those of the shake calculator 156 and the threshold value corrector 157 illustrated in FIG. 14, and correct the threshold value used in operation #622 of the flowchart in FIG. 11 by following the procedure illustrated by the flowchart in FIG. 15.

[Fifth Method for Correcting Variation Data 31]

Figure 17:
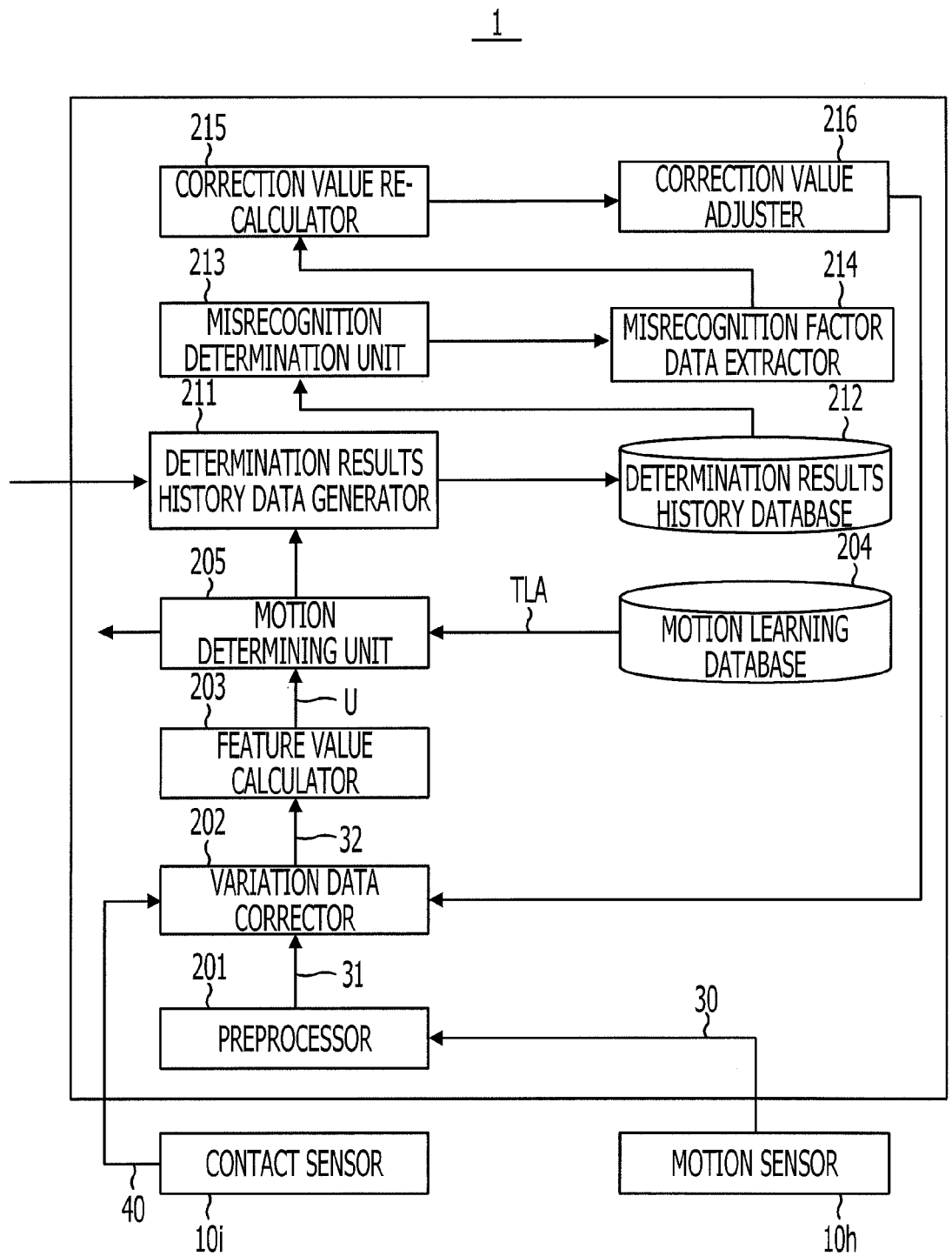
FIG. 17 illustrates an exemplary functional configuration of a mobile phone handset in the case where a fifth method is applied.
Figure 18:
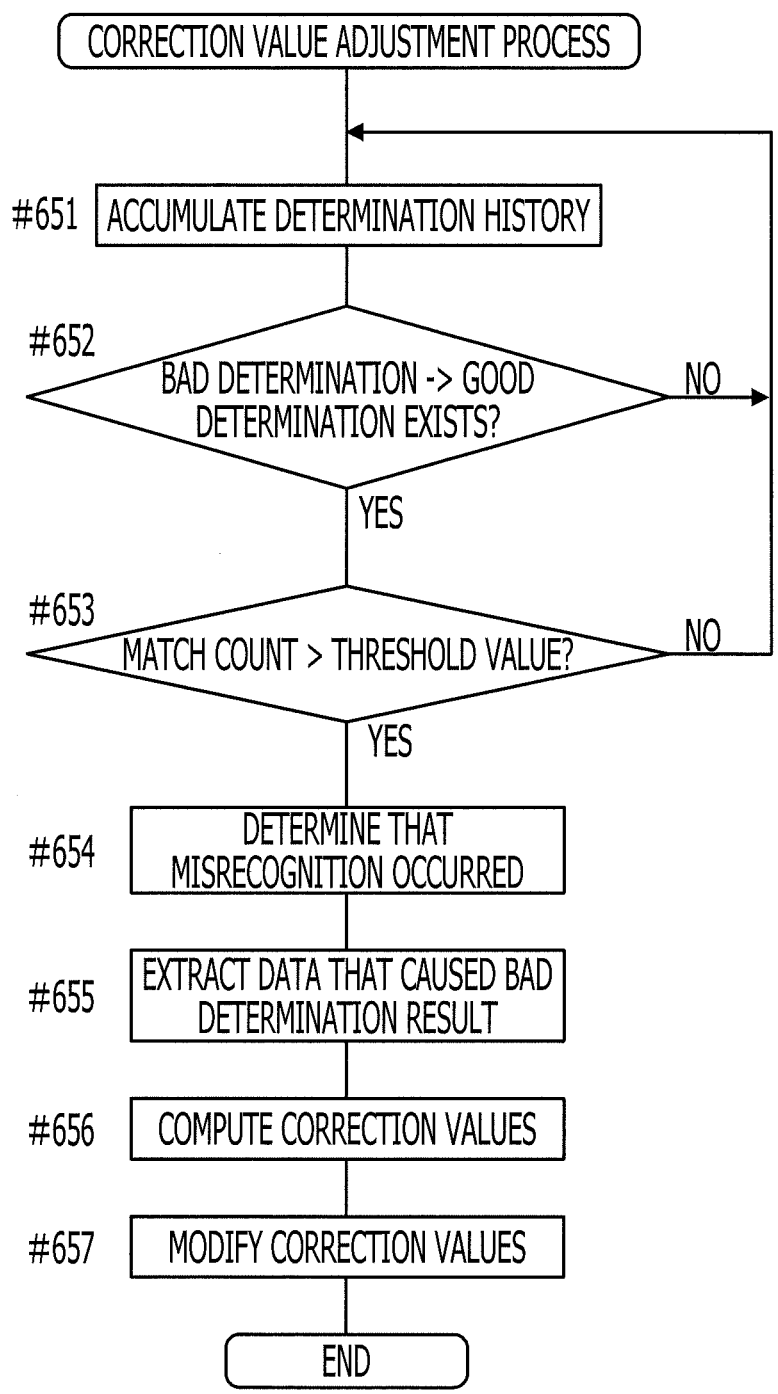
FIG. 18 is a flowchart explaining an exemplary flow of a correction value adjustment process.

FIG. 17 illustrates an exemplary functional configuration of the mobile phone handset 1 in the case where a fifth method is applied. FIG. 18 is a flowchart explaining an exemplary flow of a correction value adjustment process.

In the first through the third methods, the motion determining unit 105 in FIG. 3 determines a motion performed by the user with respect to the mobile phone handset 1 on the basis of a feature value U obtained by the feature value calculator 103.

However, the ways in which the mobile phone handset 1 is held and moved will differ slightly among different users. Furthermore, there also exist users who hold and move the mobile phone handset 1 in ways that greatly differ from the standard ways of holding and moving the mobile phone handset 1. For example, in cases where the mobile phone handset 1 should be moved parallel to a particular axis, some users have a habit of moving the mobile phone handset 1 with a significant diagonal tilt (with the mobile phone handset 1 tilted off the particular axis by close to 45°, for example). There are also users who perform motions having amplitudes and frequencies that are nearly identical to the amplitudes and frequencies of constant shake.

In the fifth method, the variation data 31 is corrected so as to eliminate the features of individual, per-user differences that may be expressed in the variation data 31. By correcting the variation data 31 in this way, a standard feature value U can be obtained, and incorrect determinations of motion can be further increased over the first through the third methods.

In the fifth method, programs and data are installed in the memory 10b in order to realize the functions of components such as the following components illustrated in FIG. 17: the preprocessor 201, the variation data corrector 202, the feature value calculator 203, the motion learning database 204, the motion determining unit 205, the determination results history data generator 211, the determination results history database 212, the misrecognition determination unit 213, the misrecognition factor data extractor 214, the correction value re-calculator 215, and the correction value adjuster 216. Hereinafter, features that are also common to the first, second, or third embodiments will be omitted from the description.

The preprocessor 201, the variation data corrector 202, the feature value calculator 203, the motion learning database 204, and the motion determining unit 205 have functions that are respectively similar to those of the preprocessor 101, the variation data corrector 102, the feature value calculator 103, the motion learning database 104, and the motion determining unit 105 in the first method.

The components from the determination results history data generator 211 to the correction value adjuster 216 execute a process according to the procedure illustrated in FIG. 18. This process is configured to adjust (i.e., correct) the correction values for correcting the variation data 31, which are used by the variation data corrector 202.

Each time a motion is determined by the motion determining unit 205, the determination results history data generator 211 takes data indicating the determination results as well as all data used to make the determination (such as the variation data 31, the variation data 32, and the feature value U), and stores this data in the determination results history database 212 as determination history data 51 (FIG. 18, #651). Hereinafter, data that indicates determination results will be referred to as the determination results data 51a, and data used to make a determination will be referred to as the determination reference data 51b.

The determination results data 51a contains a motion identifier (such as a motion name or code, for example) determined by the motion determining unit 205, as well as data indicating whether or not a determination was successful (hereinafter, this data will be referred to as the outcome data).

The success of failure of a determination is equivalent to whether or not the motion determined by the motion determining unit 205 matches the user's intended motion. In the case of a match, the outcome data indicates a successful determination. In contrast, in the case of a non-match, the outcome data indicates an incorrect determination. The case where the motion determining unit 205 is unable to specify a motion is treated as an incorrect determination in the present embodiment. In other words, if it can be inferred that the user has performed some kind of motion, but that motion does not match any of the motions registered in the motion learning database 204, then the present embodiment treats the event as an incorrect determination. Consequently, the outcome data in this case also indicates an incorrect determination.

The determination results history data generator 211 obtains the motion identifier and outcome data as follows.

Once the motion determining unit 205 has determined a motion, the determination results history data generator 211 receives the identifier of the determined motion in the form of a notification from the motion determining unit 205.

As described earlier, once a motion has been determined, a process associated with that motion is also executed, the process being indicated in the motion lookup table TLA. However, a process that is different from the user's intended process might be executed as a result of an incorrect determination by the motion determining unit 205. In such cases, the user could perform a predetermined operation (such as pressing a key that corresponds to a Cancel button, for example) before performing a subsequent operation, or within a given amount of time. If such a predetermined operation is performed, then the determination results history data generator 211 will detect that the determination was incorrect. In contrast, if such a predetermined operation is not performed, then the determination results history data generator 211 will detect that the determination was correct. In this way, the determination results history data generator 211 obtains outcome data from the user.

In addition, if the motion determining unit 205 was unable to specify a motion, then the determination results history data generator 211 receives information indicating an incorrect determination in the form of a notification from the motion determining unit 205. Such a notification is received regardless of whether or not the feature value calculator 203 was able to obtain a feature value U that satisfies the motion conditions described earlier.

Each time the motion determination process is executed by the motion determining unit 205, the determination results history data generator 211 acquires information related to that determination as described above, and generates determination history data 51 by using the acquired information as well as the data used to make the determination. Subsequently, the determination history data 51 is stored in the determination results history database 212.

The misrecognition determination unit 213 determines whether or not a misrecognition occurred as follows. Once an incorrect motion determination is detected, the misrecognition determination unit 213 attempts to detect a successful motion determination made within a fixed amount of time elapsing after the detection of the misrecognition (#652). The detection of an incorrect determination and a successful determination is conducted by checking the determination results data 51a contained in the determination history data 51, which is successively accumulated in the determination results history database 212.

If a successful determination is detected (#652, Yes), then the misrecognition determination unit 213 takes the per-axis values of each item in the determination reference data 51b contained the determination history data 51 detected to be an incorrect determination, and compares these values against the per-axis values of each item in the determination reference data 51b contained in the determination history data 51 for the successful determination. By comparing these values, the misrecognition determination unit 213 checks whether or not the difference or ratio between the values exists within a fixed range (#653). If the difference or ratio of the values does exist within a fixed range, then the misrecognition determination unit 213 treats the values as matching each other.

Furthermore, the misrecognition determination unit 213 counts the number of items treated as matching each other (hereinafter referred to as the match count). If the match count exceeds a threshold value (such as half the total number of items, for example) (#653, Yes), then the misrecognition determination unit 213 determines that a misrecognition occurred (#654). In contrast, if the match count does not exceed the threshold value, then the misrecognition determination unit 213 determines that a misrecognition has not occurred.

Alternatively, a successful determination may also be detected from among a fixed number of determinations made after an incorrect motion determination is detected.

If the misrecognition determination unit 213 determines that a misrecognition has occurred, then the misrecognition factor data extractor 214 extracts the data for the items causing the determination from among the determination reference data 51b for the incorrect motion determination (#655).

By way of example, assume that the X, Y, and Z axis accelerations expressed by the determination reference data 51b for an incorrect determination are 0.11, −0.03, and 0.33, respectively. Assume also that the X, Y, and Z axis accelerations expressed by the determination reference data 51b for a successful determination are 0.49, 0.02, and 0.29. Assume that the respective values for each axis are treated as matching if the difference between the values is less than 0.3. In this case, the X axis acceleration data is one factor causing the determination of a misrecognition. Consequently, the misrecognition factor data extractor 214 extracts the X axis acceleration as data for an item causing the determination.

The correction value re-calculator 215 then computes the respective values used by the variation data corrector 202 as follows, such that motion determination will be successful even if the determination reference data 51b extracted by the misrecognition factor data extractor 214 is used (#656). The correction value adjuster 216 changes the current correction values to the correction values computed by the correction value re-calculator 215 (#657).

If the process for correcting the variation data 31 by means of the variation data corrector 202 is conducted according to the first method, then the respective correction values in each correction value table TLB (see FIGS. 9A to 9F) stored in the correction value database of the variation data corrector 202 are corrected as follows.

The correction value re-calculator 215 computes new correction values according to the following Eqs. 4 to 9 (#656). However, the correction value re-calculator 215 only re-computes the correction values for the items causing the determination of a misrecognition. In the earlier example involving the X, Y, and Z axis accelerations, only the correction values for the X axis would be re-computed.

$$K'xp = Kxp \times (\beta 1x/\beta 2x) \quad (4)$$

$$K'yp = Kyp \times (\beta 1y/\beta 2y) \quad (5)$$

$$K'zp = Kzp \times (\beta 1z/\beta 2z) \quad (6)$$

$$K'xm = Kxm \times (\beta 1x/\beta 2x) \quad (7)$$

$$K'ym = Kym \times (\beta 1y/\beta 2y) \quad (8)$$

$$K'zm = Kzm \times (\beta 1z/\beta 2z) \quad (9)$$

In the above Eqs. 4 to 9, Kxp is the current correction value for the positive X axis direction, while K'xp is the new correction value for the positive X axis direction. Kyp is the current correction value for the positive Y axis direction, while K'yp is the new correction value for the positive Y axis direction. Kzp is the current correction value for the positive Z axis direction, while K'zp is the new correction value for the positive Z axis direction. Kxm is the current correction value for the negative X axis direction, while K'xm is the new correction value for the negative X axis direction. Kym is the current correction value for the negative Y axis direction, while K'ym is the new correction value for the negative Y axis direction. Kzm is the current correction value for the negative Z axis direction, while K'zm is the new correction value for the negative Z axis direction. $\beta 1x$ is the X axis value in the determination reference data 51b for the successful determination, while $\beta 2x$ is the X axis value in the determination reference data 51b for the incorrect determination. $\beta 1y$ is the Y axis value in the determination reference data 51b for the successful determination, while $\beta 2y$ is the Y axis value in the determination reference data 51b for the incorrect determination. $\beta 1z$ is the Z axis value in the determination reference data 51b for the successful determination, while $\beta 2z$ is the Z axis value in the determination reference data 51b for the incorrect determination.

The correction value adjuster 216 then respectively replaces the current correction values in each correction value table TLB with the new correction values computed as above (#657).

On the other hand, if the process for correcting the variation data 31 by means of the variation data corrector 202 is conducted according to the second method, then the correction values are corrected as follows.

For example, if the angle between the X axis and the ground is causing the incorrect motion determination, then the variation data is corrected as follows. Take $\theta x1$ to be the angle between the X axis and the ground at the time of the incorrect determination, and take $(\theta a + \gamma)$ to be the angle between the X axis and the ground at the time of the successful determination. From the following Eq. 10, $$\cos(\theta a + \gamma) = \cos(\theta a)\cos(\gamma) - \sin(\theta a)\sin(\gamma) \quad (10)$$

the angle $\gamma$ is computed. As described earlier, in the second method, the device angle calculator (see FIG. 10) computes $\cos(\theta x)$ as the X axis correction value. The correction value re-calculator 215 computes $\cos(\theta x + \gamma)$ as the new correction value (#656). The correction value adjuster 216 then replaces the current X axis correction value with the newly computed correction value (#657). If the angles between other axes and the ground are causing the incorrect determination, then the correction values for those axes may be similarly corrected.

Alternatively, if the process for correcting the variation data 31 by means of the variation data corrector 202 is conducted according to the third method, then the correction values are corrected as follows.

If the shake correction values correspond to amplitudes, then the correction value re-calculator 215 may successively apply coefficients (¼, ½, 2, 4, 6, etc.) in a stepwise manner to the amplitudes along the axes causing the incorrect determination. If the differences between the coefficient-multiplied amplitudes and the amplitudes for the successful determination fall within an allowable error range (i.e., if the difference becomes less than or equal to a predetermined value), then new correction values may be computed by applying the coefficients at that point to the values which lie along the axes causing the incorrect determination, and which were computed by the correction computing unit (see FIG. 12) (#656). The correction value adjuster 216 then replaces the current correction values with the newly computed correction values (#657).

Similarly, if the shake correction values are frequencies, then the correction value re-calculator 215 may successively apply stepwise coefficients to the frequencies along the axes causing the incorrect determination. If the differences between the coefficient-multiplied frequencies and the frequencies for the successful determination fall within an allowable error range, then new correction values may be computed by applying the coefficients at that point to the values which lie along the axes causing the incorrect determination, and which were computed by the correction computing unit (see FIG. 12) (#656). The correction value adjuster 216 then replaces the current correction values with the newly computed correction values (#657).

According to the present embodiment, the misrecognition of commands issued by the user can be decreased compared to the related art.

In the present embodiment, the respective components illustrated in FIG. 3 and elsewhere may also be realized by means of an integrated circuit (IC) or by large-scale integration (LSI). In such cases, the variation data corrector 102 may also be provided with a preprocessor 101.

In the present embodiment, the chassis of the mobile phone handset 1 is rectangular, as illustrated in FIGS. 1A to 1C. However, it should be appreciated that an embodiment may also be applied to the case of a folding (i.e., clamshell) chassis.

It should furthermore be appreciated that embodiments herein are not limited to mobile phone handsets and/or to any particular size and/or shape, and may also be applied to a variety of portable apparatus, such as personal digital assistants (PDAs) and handheld game consoles.

According to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be output to an output device, for example, displayed on the display.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

The invention claimed is:

1. A detected information correction apparatus comprising:
    a memory which stores instructions; and
    a computer processor coupled to the memory and executes the stored instructions which cause the computer processor to execute:
        acquire gesture status information of a portable apparatus based on an output from a first sensor which is installed in the portable apparatus, the gesture status information indicating an orientation of the portable apparatus,
        acquire grip position information from a second sensor which is installed in the portable apparatus, the grip position indicating a position of the portable apparatus where one or more hands grip,
        acquire correction data according to the orientation and the grip position, and
        correct the gesture status information with the correction data.

2. The detected information correction apparatus according to claim 1, wherein the detected gesture status information includes a first, a second, and a third angle, each being an angle between a surface and a first axis in a width direction of the portable apparatus, a second axis in a height direction of the portable apparatus, and a third axis in a depth direction of the portable apparatus, respectively,
    the detected gesture status information further includes a first, a second, and a third acceleration, each being an acceleration along the first axis, the second axis, and the third axis, respectively, and
    the acquired correction data includes a first, a second, and a third coefficient for multiplication with the first, second, and third acceleration, respectively, wherein each coefficient is a respective cosine of the detected first, second, and third angles.

3. The detected information correction apparatus according to claim 1, wherein
    the detected gesture status information indicates whether shake is being produced in the portable apparatus,
    the acquired correction data includes correction data for the shake, and
    the computer processor executes to remove components of the shake expressed by the correction data for the shake from a wave that represents a variation in the detected gesture status information.

4. The detected information correction apparatus according to claim 1, wherein
    the detected gesture status information additionally indicates whether shake is being produced in the portable apparatus, and
    the computer processor executes to acquire correction data at timing intervals when the shake is detected.

5. A portable apparatus, comprising:
    a sensor;
    a memory which stores instructions; and
    a computer processor coupled to the memory and executes the stored instructions which cause the computer processor to execute:
        acquire gesture status information of the portable apparatus based on an output from the sensor;
        acquire correction data based on the gesture status information;
        correct the gesture status information with the correction data; and
        determine commands issued to the portable apparatus based upon the gesture status information which is corrected, and
    wherein the gesture status information includes a first, a second, and a third angle, each being an angle between a surface and a first axis in a width direction of the portable apparatus, a second axis in a height direction of the portable apparatus, and a third axis in a depth direction of the portable apparatus, respectively,
    the gesture status information further includes a first, a second, and a third acceleration, each being an acceleration along the first axis, the second axis, and the third axis, respectively, and
    the correction data includes a first, a second, and a third coefficient for multiplication with the first, second, and third acceleration, respectively, wherein each coefficient is a respective cosine of the first, second, and third angles.

6. The portable apparatus according to claim 5, wherein when a command differs from an intended command, the correction data acquirer acquires new correction data.

7. A detected information correction method for execution by a computer processor for a portable apparatus, the method comprising:
    executing by the computer processor:
        acquiring gesture status information of the portable apparatus based on an output from a first sensor which is installed in the portable apparatus, the gesture status information indicating an orientation of the portable apparatus;
        acquiring grip position information from a second sensor which is installed in the portable apparatus, the grip position indicating a position of the portable apparatus where one or more hands grip; and
        correcting the gesture status information according to correction data acquired based on the orientation and the grip position.

8. The apparatus according to claim 1, wherein the detected gesture status information includes variation data of orientations of the portable apparatus and the correction data corrects the variation data to emphasize a movement along a certain axis from among direction axes set for the portable apparatus.

9. The apparatus according to claim 8, wherein the certain axis is determined according to one or more factors of mis-recognition, recognition, user profile, portable apparatus location, or shake of the portable apparatus.

* * * * *